US012731227B2

(12) United States Patent
Yang et al.

(10) Patent No.: US 12,731,227 B2
(45) Date of Patent: Sep. 8, 2026

(54) SYSTEMS, METHODS, STORAGE MEDIUMS FOR IMAGE PROCESSING

(71) Applicant: SHANGHAI UNITED IMAGING HEALTHCARE CO., LTD., Shanghai (CN)

(72) Inventors: Le Yang, Shanghai (CN); Zhou Yuan, Shanghai (CN); Yang Hu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 210 days.

(21) Appl. No.: 18/513,449

(22) Filed: Nov. 17, 2023

(65) Prior Publication Data

US 2024/0169490 A1 May 23, 2024

(30) Foreign Application Priority Data

Nov. 17, 2022 (CN) ........................ 202211439960.9

(51) Int. Cl.

| | |
|---|---|
| ***G06T 5/70*** | (2024.01) |
| ***G06T 7/11*** | (2017.01) |
| ***G06V 10/42*** | (2022.01) |
| ***G06V 10/75*** | (2022.01) |
| ***G06V 10/764*** | (2022.01) |
| ***G06V 10/77*** | (2022.01) |

(52) U.S. Cl.

CPC .................. *G06T 5/70* (2024.01); *G06T 7/11* (2017.01); *G06V 10/42* (2022.01); *G06V 10/751* (2022.01); *G06V 10/764* (2022.01); *G06V 10/7715* (2022.01); *G06T 2207/20021* (2013.01); *G06T 2207/20081* (2013.01)

(58) Field of Classification Search

CPC .. G06V 10/42; G06V 10/751; G06V 10/7715; G06V 2207/20021; G06V 2207/20084

USPC .......................................................... 382/206

See application file for complete search history.

(56) References Cited

U.S. PATENT DOCUMENTS

| | | | | |
|---|---|---|---|---|
| 9,367,758 | B2 * | 6/2016 | Cao | G06V 10/50 |
| 2017/0186192 | A1 * | 6/2017 | Yang | G06T 7/11 |
| 2017/0301072 | A1 * | 10/2017 | Chandra | G06T 11/60 |
| 2018/0075370 | A1 * | 3/2018 | Cheng | G06N 7/01 |
| 2022/0084305 | A1 * | 3/2022 | Zhang | G06V 10/56 |
| 2023/0222781 | A1 * | 7/2023 | Kim | G06V 10/806<br>382/156 |

FOREIGN PATENT DOCUMENTS

CN 109493290 B 10/2021

* cited by examiner

*Primary Examiner* — Nancy Bitar
*Assistant Examiner* — Karsten Foster Lantz
(74) *Attorney, Agent, or Firm* — METIS IP LLC

(57) ABSTRACT

The present disclosure provides a method for image processing. The method may include obtaining an image; for a target pixel in the image; determining, from the image, a relevant pixel of the target pixel; wherein the relevant pixel may be determined based on a difference between the target pixel and other pixels in the image; an determining a target pixel value of the target pixel by adjusting an initial pixel value of the target pixel based on the relevant pixel.

16 Claims, 8 Drawing Sheets

100

Figure 4:
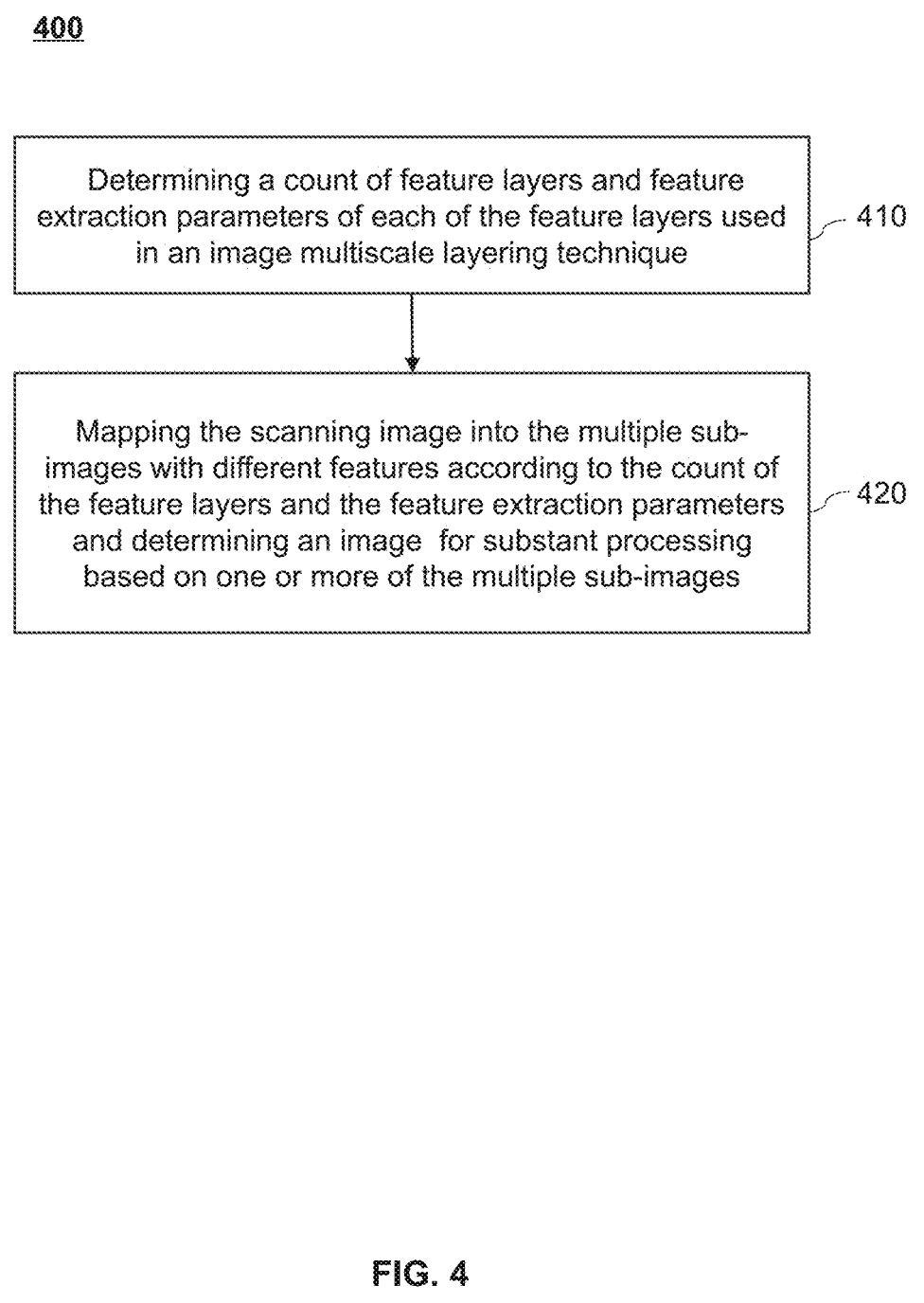

400

Determining a count of feature layers and feature extraction parameters of each of the feature layers used in an image multiscale layering technique

410

Mapping the scanning image into the multiple sub-images with different features according to the count of the feature layers and the feature extraction parameters and determining an image for substant processing based on one or more of the multiple sub-images

SYSTEMS, METHODS, STORAGE MEDIUMS FOR IMAGE PROCESSING

CROSS-REFERENCE TO RELATED APPLICATIONS

This application claims priority to the Chinese Patent Application No. 202211439960.9, filed on Nov. 17, 2022, the contents of which are hereby incorporated by reference.

TECHNICAL FIELD

The present disclosure relates to a medical technology field, in particular, relates to methods, systems, and storage devices for image processing.

BACKGROUND

During medical diagnosis and treatment, the quality of medical images plays a crucial role. High-quality medical images can reduce false-positive and false negative in diagnosis. Existing medical imaging techniques such as X-ray imaging, nuclear magnetic resonance imaging, nuclear medicine imaging, ultrasound imaging, etc., may generate varying degrees of noises, significantly reducing the quality of generated images and increasing the risk of missed diagnosis and erroneous diagnosis.

Therefore, it is desired to provide a method, system, and storage medium for image process to improve the quality of images.

SUMMARY

One aspect of embodiments of the present disclosure may provide a method for image processing. The method may include obtaining an image; and for a target pixel in the image; determining, from the image, a relevant pixel of the target pixel; wherein the relevant pixel may be determined based on a difference between the target pixel and other pixels in the image; and determining a target pixel value of the target pixel by adjusting an initial pixel value of the target pixel based on the relevant pixel.

In some embodiments, the obtaining an image may include: obtaining a scanning image; and determining a count of feature layers in an image multiscale layering process; determining feature extraction parameters of each of the feature layers; and mapping the scanning image into the multiple sub-images with different features according to the count of the feature layers and the feature extraction parameters; and determining the image based on one or more of the multiple sub-images.

In some embodiments, the determining the count of feature layers and the feature extraction parameters of each of the feature layers may include: determining a global image feature of the scanning image; and determining the count of the feature layers and the feature extraction parameters of each of the feature layer based on the global image feature.

In some embodiments, the determining the relevant pixel of the target pixel may include: determining a pixel set based on a first condition; and determining a pixel that satisfies a second condition in the pixel set, and determining, based on the pixel that satisfies the second condition, the relevant pixel of the target pixel, wherein the second condition may be determined based on a pixel value of a pixel in a difference image of the image.

In some embodiments, the first condition may include that a pixel is located within a neighborhood region centered around the target pixel and is not the target pixel.

In some embodiments, the neighborhood region may be determined according to operations including: determining neighborhood parameter information of the neighborhood region using a neighborhood determination model based on the image, wherein the neighborhood determination model includes a trained machine learning model; and determining a neighborhood region corresponding to the target pixel based on the target pixel and the neighborhood parameter information.

In some embodiments, the image may be determined based on a scanning image using an image multiscale layering process, and the neighborhood region may be determined according to operations including: obtaining a count of target feature layers corresponding to the image and target feature extraction parameters of each of the target feature layers used in an image multiscale layering process of the scanning image; determining neighborhood parameter information of the neighborhood region based on the count of the target feature layers and the target feature extraction parameters; and determining a neighborhood region corresponding to the target pixel based on the target pixel and the neighborhood parameter information.

In some embodiments, the neighborhood region may be determined according to operations including: determining a reference pixel within a reference region corresponding to the target pixel; determining the neighborhood parameter information of the neighborhood region corresponding to the target pixel based on the initial pixel value of the target pixel and a reference pixel value of the reference pixel; and determining the neighborhood region corresponding to the target pixel based on the target pixel and the neighborhood parameter information.

In some embodiments, the neighborhood region may be determined according to operations including: dividing the image into a plurality of sub-regions; determining a type of a sub-region corresponding to the target pixel among the plurality of sub-regions; determining neighborhood parameter information of the neighborhood region corresponding to the target pixel point based on the type; and determining the neighborhood region corresponding to the target pixel based on the target pixel and the neighborhood parameter information.

In some embodiments, the pixel value of the pixel in the difference image may be relevant to a correction factor, and the correction factor may be determined based on a gray-scale value of a pixel in the image and a first parameter.

In some embodiments, the first parameter may be determined based on image features of the image.

In some embodiments, the second condition may include: a value of an element in a target difference being smaller than a difference threshold, wherein the target difference may include a pixel value of a pixel in the difference image corresponding to the target pixel; the difference threshold may be a pixel value of a pixel in the threshold template image corresponding to the target pixel; and the threshold template image may be obtained based on a difference degree of pixel values in the image.

In some embodiments, the value of the pixel in the threshold template image may be relevant to a dispersion degree of a pixel value distribution in the image and a second parameter.

In some embodiments, the second parameter may be determined based on a confidence interval of a normal distribution.

In some embodiments, the dispersion degree of the pixel value distribution in the image may be determined based on a standard deviation image, the pixel value of the pixel in the threshold template image may be determined according to operations including: for each pixel in the threshold template image, determining a first candidate threshold based on a pixel value of the pixel in a reference image and a pixel value of the pixel in the image; determining a second candidate threshold based on a pixel value of the pixel in the standard deviation image and the second parameter; and determining a pixel value of the pixel in the threshold template image based on the first candidate threshold and the second candidate threshold.

In some embodiments, the determining, based on the pixel that satisfies the second condition, the relevant pixel of the target pixel may include: determining the pixel that satisfies the second condition as the relevant pixel of the target pixel.

In some embodiments, the determining, based on the pixel that satisfies the second condition, the relevant pixel of the target pixel may include: in response to determining that a pixel value of a pixel in a template image corresponding to the target pixel is a first value, determining a pixel that satisfies a third condition as the relevant pixel of the target pixel, wherein the third condition may include a pixel value of a pixel in the image being greater than or equal to the pixel value of the pixel in the image corresponding to the target pixel; and in response to determining that a pixel value of a pixel in a template image corresponding to the target pixel is a second value, determining a pixel that satisfies a fourth condition as the relevant pixel of the target pixel, wherein the fourth condition may include a pixel value of a pixel in the image being less than or equal to the pixel value of the pixel in the image corresponding to the target pixel.

In some embodiments, the target pixel in the image may be determined according to operations including: obtaining a reference image corresponding to the image; determining a template image based on the reference image and the image; determining the target pixel in the image based on a pixel value of a pixel in the template image.

Another aspect of embodiments of the present disclosure may provide a system for performing a data processing task. The system may include at least one storage device including a set of instructions; and at least one processor configured to communicate with the at least one storage device, wherein when executing the set of instructions, the at least one processor is configured to direct the system to perform operations including: obtaining an image; and for a target pixel in the image; determining, from the image, a relevant pixel of the target pixel; wherein the relevant pixel is determined based on a difference among pixels in the image; and determining a target pixel value of the target pixel by adjusting an initial pixel value of the target pixel based on the relevant pixel.

Another aspect of embodiments of the present disclosure may provide a non-transitory computer readable medium. The non-transitory computer readable medium may include at least one set of instructions, wherein when executed by one or more processors of a computing device, the at least one set of instructions causes the computing device to perform a method, the method comprising: obtaining an image; and for a target pixel in the image; determining, from the image, a relevant pixel of the target pixel point; wherein the relevant pixel is determined based on a difference among pixels in the image; and determining a target pixel value of the target pixel by adjusting an initial pixel value of the target pixel based on the relevant pixel.

BRIEF DESCRIPTION OF THE DRAWINGS

This specification will be further illustrated by way of exemplary embodiments, which will be described in detail with the accompanying drawings. These examples are non-limiting, and in these examples, the same number indicates the same structure, wherein:

FIG. 4 is a flowchart illustrating an exemplary process for determining an image according to some embodiments of the present disclosure;

DETAILED DESCRIPTION

Figure 1:
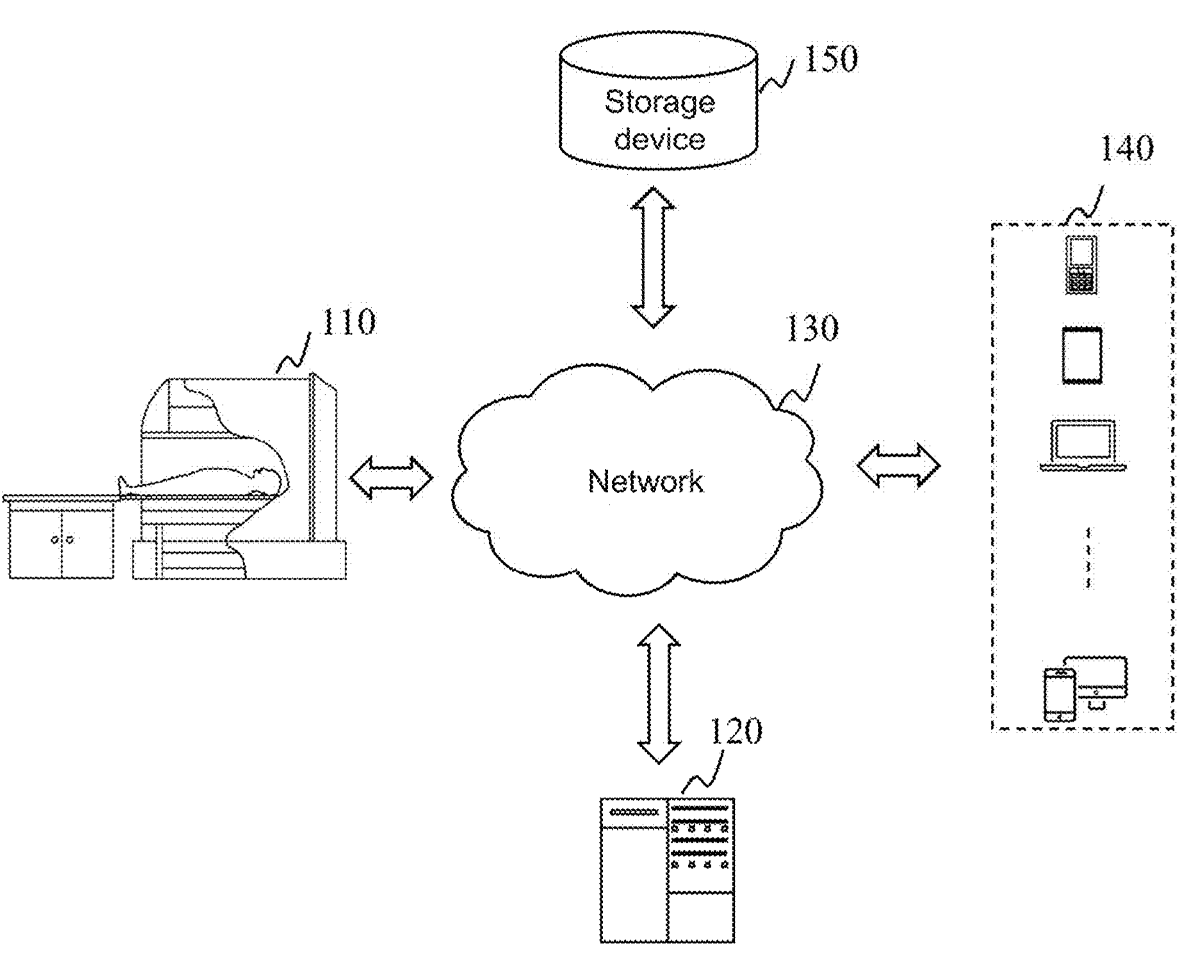
FIG. 1 is a schematic diagram illustrating an exemplary application scenario of an image processing system according to some embodiments of the present disclosure.

In order to more clearly illustrate the technical solutions of the embodiments of the present specification, the following briefly introduces the drawings that need to be used in the description of the embodiments. Apparently, the accompanying drawings in the following description are only some examples or embodiments of this specification, and those skilled in the art can also apply this specification to other similar scenarios. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, parts or assemblies of different levels. However, the words may be replaced by other expressions if other words can achieve the same purpose.

As indicated in the specification and claims, the terms "a", "an", "an" and/or "the" are not specific to the singular and may include the plural unless the context clearly indicates an exception. Generally speaking, the terms "comprising" and "comprising" only suggest the inclusion of clearly identified steps and elements, and these steps and elements do not constitute an exclusive list, and the method or device may also contain other steps or elements.

A flowchart is used in the present disclosure to illustrate the operations performed by the system according to the embodiments of the present disclosure. It should be understood that the preceding or following operations may not be performed accurately in sequence. On the contrary, each step can be processed in reverse order or simultaneously. At the same time, other operations can also be added to these processes, or a step or several operations can be removed from these processes.

In some application scenarios, an image processing system may include a processing device and an imaging device. The image processing system may process images acquired by the imaging device by implementing methods and/or processes disclosed in the present disclosure by using the processing device, or the like, to improve the image quality and diagnostic effectiveness.

As used herein, the size of an image refers to a count of pixels that used to denote each of the length and the width of the image. For example, the size of a certain image may be 500×500, means that the length of the image and the width of the image are denoted by 500 pixels, respectively.

FIG. 1 is a schematic diagram illustrating an exemplary application scenario of an image processing system according to some embodiments of the present disclosure.

As shown in FIG. 1, in some embodiments, components in an image processing system 100 of the image processing system 100 may include a imaging device 110, a processing device 120, a network 130, a terminal 140, and a storage device 150. In some embodiments, the components in the image processing system 100 may connect and/or communicate with each other through the network 130 (e.g., wireless connection, wired connection, or a combination thereof).

In some embodiments, the image processing system 100 may process an image acquired by the imaging device 110 and/or provided by the terminal 140. When the processing device 120 obtains the image acquired by the imaging device 110 and/or provided by the terminal 140, the image may be designated as an image to be processed (which also be referred to as "image" in the following description) to improve the image quality.

The imaging device 110 may include a medical imaging device, a visual imaging device, a radar device, etc. The medical imaging device refers to a device that reproduces an internal structure of an organism into an image by using a certain medium. In some embodiments, the imaging device 110 may be any medical device that performs imaging or treatment on a designated body part of a patient, such as an ultrasound imaging system, a computer X-ray imaging system, a magnetic resonance imaging system, or the like. The imaging device 110 provided above is for illustrative purposes only and is not limited in the scope. In some embodiments, the imaging device 110 may acquire an image containing a specified body part of the patient and send the image to the processing device 120. The imaging device 110 may receive instructions or data sent by users (e.g., doctors) through the terminal 140 and perform related operations such as irradiation imaging based on the instructions. In some embodiments, the imaging device 110 may be directly connected with other components in the image processing system 100. In some embodiments, the imaging device 110 may exchange data and/or information with other components in the image processing system 100 (e.g., the processing device 120, the terminal 140, the storage device 150) through the network 130. In some embodiments, the one or more components (e.g., the processing device 120, the storage device 150) in the image processing system 100 may be included within the imaging device 110.

The processing device 120 may process data and/or information related to the image processing system. For example, the processing device 120 may obtain the images acquired from the imaging device 110, and the images may be designated as images to be processed for processing. In some embodiments, the processing device 120 may send the processed data, such as a difference image, a standard deviation image, a threshold template image, a reference image, an image after adjusting an initial pixel value of a target pixel (i.e., an image including a target pixel value of the target pixel), to the storage device 150 for storage. In some embodiments, the processing device 120 may obtain pre-stored data and/or information from the storage device 150, such as a formula for determining the pixel value of the pixel in the threshold template image, or the like, to execute the image processing processes shown in some embodiments of the present disclosure, such as determining a pixel value of a pixel in the threshold template image.

In some embodiments, the processing device 120 may include one or more sub-processing devices (e.g., single core processing devices or multi-core processing devices). Merely for example, the processing device 120 may include a central processing unit (CPU), specialized integrated circuits (ASICs), specialized instruction processors (ASIPs), graphics processors (GPUs), physical processors (PPUs), digital signal processors (DSPs), field programmable gate arrays (FPGAs), programmable logic circuits (PLDs), controllers, microcontroller units, reduced instruction set computers (RISCs), microprocessors, or any combination thereof. The processing device 120 may process data, information, and/or processing results obtained from other devices or the components of the system, and execute program instructions based on the data, information, and/or processing results to perform one or more functions described in the present disclosure.

The network 130 may connect various components of the system and/or connect the system with external resource parts. The network 130 may enable communication between various components and with other parts outside the system, which promotes the exchange of data and/or information. In some embodiments, the one or more components in the image processing system 100 (e.g., the imaging device 110, the processing device 120, the terminal 140, the storage device 150) may send the data and/or information to other components through the network 130. In some embodiments, the network 130 may be any one or more of wired or wireless networks.

The terminal 140 refers to a device or software used by users related to the image processing system 100, and the user related to the image processing system 100 may include a doctor, a nurse, a patient, or the like. For example, the terminal 140 may be a device or software that controls operations of the imaging device 110. The doctor may issue an operating instruction to the imaging device 110 through the terminal 140 to enable the imaging device 110 to complete specified operations (e.g., irradiation imaging of a designated body part of the patient). In some embodiments, the terminal 140 may instruct the processing device 120 to execute the image processing processes as shown in some embodiments of the present disclosure. In some embodiments, the terminal 140 may receive processed images from the processing device 120. In some embodiments, the terminal 140 may send an image to processing device 120. In some embodiments, the terminal 140 may be one or any combination of other devices with input and/or output functions, such as mobile devices, tablets, laptops, desktop computers, or the like.

The storage device 150 may be configured to store data and/or instructions. The storage device 150 may be implemented in a single central server, multiple servers connected through communication links, or multiple personal devices. In some embodiments, the storage device 150 may include a large capacity memory, a removable memory, a read write memory, a read-only memory, or any combination thereof. In some embodiments, the storage device 150 may be implemented on a cloud platform. In some embodiments, the storage device 150 may store the data and/or information acquired by the imaging device 110, such as scanning images, or the like. In some embodiments, the storage device 150 may store data and/or information processed by the processing device 120, such as the difference image, the standard deviation image, the threshold template image, the reference image, the image after adjusting the initial pixel value of the target pixel, or the like.

Figure 2:
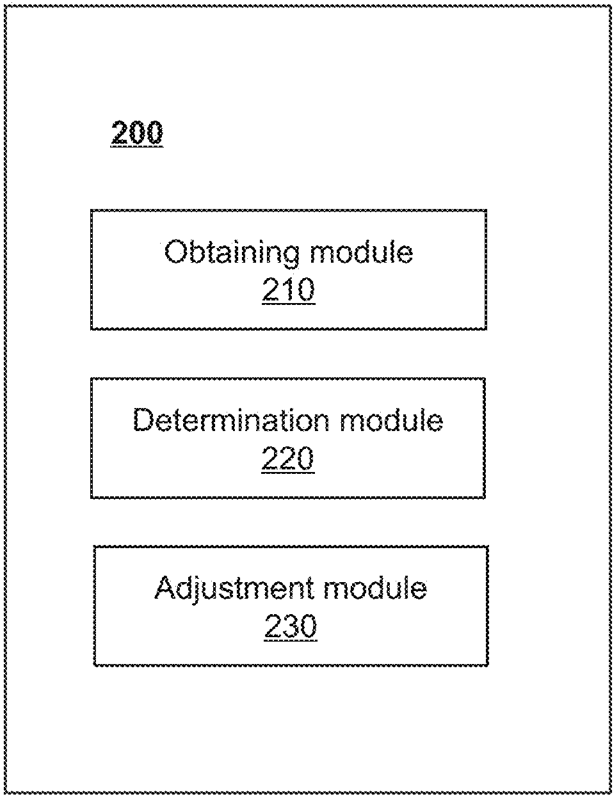
FIG. 2 is a schematic diagram illustrating exemplary modules of an image processing system according to some embodiments of the present disclosure.

FIG. 2 is a schematic diagram illustrating exemplary modules of an image processing system according to some embodiments of the present disclosure.

As shown in FIG. 2, in some embodiments, an image processing system 200 may include an obtaining module 210, a determination module 220, and an adjustment module 230.

The obtaining module 210 may be configured to obtain an image. More descriptions of the image may be found in FIG. 3 and related descriptions.

In some embodiments, the obtaining module 210 may further be configured to obtain a scanning image; determine a count of feature layers used in an image multiscale layering technique; determine feature extraction parameters of each of the feature layers; map the scanning image into the multiple sub-images with different features according to the count of the feature layers and the feature extraction parameters; and determine an image for substant processing based on one or more of the multiple sub-images. More descriptions of the scanning image, the image multiscale layering process, the sub-images, the count of feature layers, and the feature extraction parameters may be found in FIG. 4 and related descriptions.

In some embodiments, the obtaining module 210 may be configured to determine a global image feature of the scanning image; and determine the count of the feature layers and the feature extraction parameters of each of the feature layer based on the global image feature. More descriptions of the global image feature may be found in FIG. 4 and related descriptions.

The determination module 220 may be configured to determine a relevant pixel of the target pixel point from the image; wherein the relevant pixel may be determined based on a difference between the target pixel and other pixels in the image. More descriptions of the target pixel, the relevant pixel may be found in FIG. 3 and related descriptions.

In some embodiments, the determination module 220 may further be configured to determine a pixel set based on a first condition; determine a pixel that satisfies a second condition in the pixel set; determine, based on the pixel that satisfies the second condition as the relevant pixel of the target pixel; wherein the second condition is determined based on a pixel value of a pixel in a difference image of the image. More descriptions of the first condition, the pixel set, the second condition, and the difference image may be found in FIG. 3 and related descriptions.

In some embodiments, the first condition may include that a pixel is located within a neighborhood region centered around the target pixel and is not the target pixel.

In some embodiments, the determination module 220 may further be configured to determine neighborhood parameter information of the neighborhood region using a neighborhood determination model based on the image, wherein the neighborhood determination model includes a trained machine learning model; determine a neighborhood region corresponding to the target pixel based on the target pixel and the neighborhood parameter information. More descriptions of the neighborhood region, the neighborhood determination model, and the neighborhood parameter information of the neighborhood region may be found in FIG. 5 and related descriptions.

In some embodiments, the determination module 220 may further be configured to obtain a count of target feature layers corresponding to the image and target feature extraction parameters of each of the target feature layers used in an image multiscale layering process of the scanning image; determine neighborhood parameter information of the neighborhood region based on the count of the target feature layers and the target feature extraction parameters; and determine a neighborhood region corresponding to the target pixel based on the target pixel and the neighborhood parameter information. More descriptions of the count of target feature layers and the target feature extraction parameters may be found in FIG. 5 and related descriptions.

In some embodiments, the determination module 220 may further be configured to determine a reference pixel within a reference region corresponding to the target pixel; determine neighborhood parameter information of the neighborhood region corresponding to the target pixel based on the initial pixel value of the target pixel and a reference pixel value of the reference pixel; and determine the neighborhood region corresponding to the target pixel based on the target pixel and the neighborhood parameter information. More descriptions of the reference pixel, the initial pixel value, and the reference pixel value may be found in FIG. 5 and related descriptions.

In some embodiments, the determination module 220 may further be configured to divide the image into a plurality of sub-regions; determine a type of a sub-region corresponding to the target pixel among the plurality of sub-regions; determine neighborhood parameter information of the neighborhood region corresponding to the target pixel point based on the type; determine the neighborhood region corresponding to the target pixel based on the target pixel and the neighborhood parameter information. More descriptions of sub-regions and the type may be found in FIG. 5 and related descriptions.

In some embodiments, the determination module 220 may further be configured to obtain a count of target feature layers corresponding to the image and target feature extraction parameters of each of the target feature layers used for the image multiscale layering process; determine a count of the plurality of sub-regions and types of the plurality of sub-regions based on the count of target feature layers and the target feature extraction parameters; and determine the plurality of sub-regions by dividing the image based on the count of the plurality of sub-regions and the types of the plurality of sub-regions. More descriptions of the count of the plurality of sub-regions and the types of the plurality of sub-regions may be found in FIG. 5 and related descriptions.

In some embodiments, the pixel value of the pixel in the difference image may be relevant to a correction factor, and the correction factor may be determined based on a grayscale value of a pixel in the image and a first parameter. More descriptions of the correction factor may be found in FIG. 5 and related descriptions.

In some embodiments, the first parameter may be determined based on image features of the image. More descriptions of the image features may be found in FIG. 5 and related descriptions.

In some embodiments, the second condition may include: a value of an element in the target difference being less than the difference threshold; the target difference may include a pixel value of a pixel in the difference image corresponding to the target pixel, the threshold template image may be obtained based on a difference degree of the pixel value in the image. More descriptions of the threshold template image may be found in FIG. 7 and related descriptions.

In some embodiments, the value of the pixel point in the threshold template image may be relevant to a dispersion degree of a pixel value distribution in the image and a second parameter. More descriptions of the dispersion degree of the pixel value distribution may be found in FIG. 5 and related descriptions.

In some embodiments, the determination module 220 may further be configured to determine the pixel that satisfies the second condition as the relevant pixel of the target pixel. In some embodiments, in response to determining that a pixel value of a pixel in a template image corresponding to the target pixel is a first value, the determination module 220 may determine a pixel that satisfies a third condition as the relevant pixel of the target pixel, wherein the third condition may include a pixel value of a pixel in the image being greater than or equal to the pixel value of the pixel in the image corresponding to the target pixel; and in response to determining that a pixel value of a pixel in a template image corresponding to the target pixel is a second value, the determination module 220 may determine a pixel that satisfies a fourth condition as the relevant pixel of the target pixel, wherein the fourth condition may include a pixel value of a pixel in the image being less than or equal to the pixel value of the pixel in the image corresponding to the target pixel.

In some embodiments, the second parameter may be determined based on a confidence interval of a normal distribution. More descriptions of the confidence interval of the normal distribution image may be found in FIG. 7 and related descriptions.

The adjustment module 230 may be configured to determine a target pixel value of the target pixel by adjusting an initial pixel value of the target pixel based on the relevant pixel. More descriptions of the process of adjusting the initial pixel value of the target pixel and determining the target pixel value of the target pixel may be found in FIG. 3 and related descriptions.

In some embodiments, the image processing system 200 may further include other modules, for example, the image processing system 200 may include a threshold determination module (not shown in figure) and/or a target pixel determination module (not shown in the figure).

In some embodiments, the dispersion degree of the pixel value distribution in the image may be determined based on a standard deviation image. The pixel value of the pixel in the threshold template image may be determined according to operations including for each pixel in the threshold template image, determining a first candidate threshold based on a pixel value of the pixel in a reference image and a pixel value of the pixel in the image; determining a second candidate threshold based on a pixel value of the pixel in the standard deviation image and the second parameter; and determining the pixel value of the pixel in the threshold template image based on the first candidate threshold and the second candidate threshold.

In some embodiments, the threshold determination module may further be configured to determine a maximum value in the first candidate threshold and the second candidate threshold as the pixel value of the pixel in the threshold template image.

In some embodiments, the target pixel determination module may further be configured to obtain a reference image corresponding to the image; determine a template image based on the reference image and the image; and determine the target pixel in the image based on a pixel value of a pixel in the template image.

It should be noted that the above description of the image processing system 200 and its modules is for convenience only and cannot limit the specification to the scope of the cited embodiments. It can be understood that for those skilled in the art, after understanding the principle of the system, they may arbitrarily combine various modules or form subsystems to connect with other modules without deviating from this principle. In some embodiments, the obtaining module 210, the determination module 220, and the adjustment module 230 disclosed in FIG. 2 may be different modules in the same system, or a module that implements the functions of two or more modules mentioned above. For example, each module may share the processing device 120 shown in a storage module for execution.

Figure 3:
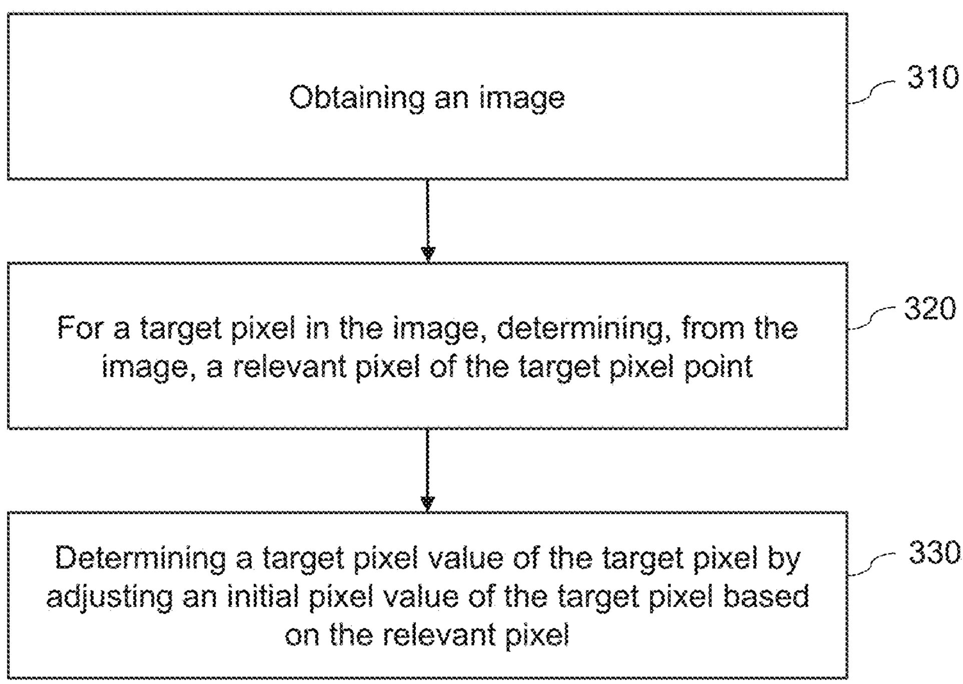
FIG. 3 is a flowchart illustrating an exemplary image processing process according to some embodiments of the present disclosure.

FIG. 3 is a flowchart illustrating an exemplary image processing process according to some embodiments of the present disclosure. In some embodiments, process 300 may be performed by the processing device 120.

In 310, an image may be obtained. In some embodiments, operation 310 may be performed by the obtaining module 210.

In some embodiments, the image may include a single channel image and a multi-channel image.

The single channel image refers to an image including pixels each of which has only one color component, such as a grayscale image. A pixel value of a pixel in the single channel image may be a value of a single color component of a pixel, and the value of the single color component of the pixel may also be referred to as a grayscale value of the pixel.

The multi-channel image refers to an image including pixels each of which has multiple color components. For example, a RGB color image may be a three-channels image. The pixel value of the pixel in the multi-channel image may be a matrix composed of the values of multiple color components of the pixel. For the multi-channel image, the grayscale value of the pixel may be determined based on the values of the one or more color components of the pixel. For example, (an average value of the values of the multiple color components of a pixel may be designated as the grayscale value).

In some embodiments, the processing device may obtain a scanning image of a target object (e.g., a patient) acquired by the imaging device and use the scanning image as an image to be processed. The scanning image may be an image acquired from the target object through the imaging device. The processing device may obtain scanning data obtained by the imaging device scanning the target object, and perform an image reconstruction on the scanning data to obtain the scanning image.

In some embodiments, the processing device may obtain the image through a storage device (e.g., the storage device 150) or other manners (e.g., through the terminal 140), which may not be limited herein.

In some embodiments, in response to determining that the scanning image (e.g., an image acquired through the imaging device 110) is a multi-channel image (such as an RGB image), the processing device may divide the scanning image into multiple single channel sub-images and designate each single channel sub-image as the image. Further, the processing device may perform the process for image processing described in some embodiments of the present disclosure on each single channel sub-image, and merge the processed sub-images (e.g., merging the multiple single channels into multiple channels) to obtain a final processed image.

In some embodiments, after dividing the scanning image into single channel images, the single channel images may be designated as the images for processing independently before the merging, thus the adjustment may be performed without losing information about each channel of the multi-channel image, resulting in a processed image with better quality.

In some embodiments, the processing device may divide the scanning image into multiple single channel sub-images based on each color component of the multiple color components of the image.

In some embodiments, the processing device may divide the scanning image into the multiple single channel sub-images by mapping the scanning image into the multiple sub-images with different features based on an image multiscale layering technique.

The image multiscale layering technique refers to an image processing technique that maps the image into multiple sub-images. In some embodiments, the image multiscale layering technique may include using an image processing algorithm such as a region layering algorithm, an image pyramid layering algorithm, or the like. For example, the processing device may map the scanning image with a resolution of 300*300 dpi into a sub-image with a resolution of 50*50 dpi and a sub-image with a resolution of 30*30 dpi through the image multiscale layering process.

The sub-images may include same information as the scanning image, and the sub-images may reflect image features of the image at different feature scales. The features of the sub-images may include a resolution, a grayscale value, or the like.

In some embodiments, the processing device may map the scanning image into the multiple sub-images based on the count of feature layers and feature extraction parameters of each of the feature layers used in the image multiscale layering technique. Other feature parameters may also be used to map the scanning image using the image multiscale layering technique. More descriptions for determining the count of the feature layers and the feature extraction parameters of each of the feature layers may be found in FIG. 4 and related descriptions.

In some embodiments, the processing device may determine the image based on the sub-images. For example, the processing device may directly designate one of the sub-images as the image.

In some embodiments, by mapping the scanning image into multiple different sub-images using the image multiscale layering process, each of the sub-images may be designated as the image, which can optimize a final image processing effect.

In some embodiments, the processing device may perform the image processing processes described in some embodiments of the present disclosure on each image determined by the sub-images to obtain processed sub-images corresponding to the sub-images, and perform a reverse process of image multiscale layering on the processed sub-images to obtain a processed image of the scanning image, and the pixel value of the target pixel in the processed image may be the target pixel value. In some embodiments of the present disclosure, by dividing the scanning image into multiple sub-images with different features using the image multiscale layering technique and designating the sub-images as the images for processing independently, the image can be processed adaptively at different feature scales, resulting in the processed image with better quality.

In some embodiments, different processing parameters may be used for processing the images with different features.

The processing parameters may include a scale of a neighborhood region, a first parameter, a second parameter, and other parameters used in some embodiments of the present disclosure. The neighborhood region may be a preset range that the target pixel and a pixel related to the target pixel that satisfies the first condition are located. The first parameter may be determined based on an image feature (e.g., an average grayscale value, etc.) of the image. The second parameter may be determined based on a confidence interval of normal distribution. More descriptions of the scale of the neighborhood region, the first parameter, and the second parameter may be found elsewhere in the present disclosure. More descriptions of processing the images with different features may be found in FIG. 4 and related descriptions.

In some embodiments, the processing parameters may be determined based on the features of the image (e.g., a resolution). For example, the smaller the resolution of the image, the smaller the scale of the neighborhood region and the first parameter may be.

In some embodiments, by using the different processing parameters for processing the images with different features, more targeted processing for processing the images with different features can be achieved, thereby optimizing a final image processing effect.

In 320, for a target pixel in the image, a relevant pixel of the target pixel may be determined from the image. In some embodiments, the operation 320 may be performed by the determination module 220.

The target pixel refers to a pixel in the image that needs to be adjusted.

The processing device may determine each of pixels (e.g., all pixels) in the image as the target pixel.

In some embodiments, the processing device may obtain a reference image corresponding to the image; determine a template image based on the reference image and the image; and determine the target pixel in the image based on a pixel value of a pixel in the template image. More description of obtaining the reference image may be found in FIG. 9 and related descriptions.

The template image may be an image obtained based on the image and the reference image. The reference image, the template image, and the image may be in a same image size, and the pixels in the reference image, the template image, and the image may correspond one by one based on the positional relationship.

In some embodiments, the pixel value of each pixel in the template image may be obtained according to the following Equation (1):

$$d = \begin{cases} 0, & o \le a \\ 1, & o > a \end{cases} \tag{1}$$

d reflects a pixel value of each pixel in the template image, o reflects a pixel value of each pixel in the image, a reflects a pixel value of each pixel in the reference image, i.e., a reference pixel value of the pixel. The pixel value "0" of the pixel in the template image refers to a first value of the pixel value, representing the pixel value of the pixel in the reference image being greater than or equal to the pixel value of the pixel in the image. The pixel value "1" of the pixel in the template image refers to a second value of the pixel value, representing the pixel value of the pixel in the reference image being less than the pixel value of the pixel in the image.

It should be noted that the reference image reflects a processed image after performing the image processing (e.g., a large scale denoising processing such as Gaussian filtering, mean filtering, etc.) on the image, which may be used to characterize a denoising direction of each pixel in the image. When the pixel value of the pixel in the template image is a first value, the pixel value of the pixel in the image may be increased after the denoising processing is performed on a corresponding pixel in the image. Correspondingly, when the pixel value of the pixel in the template image is a second value, the pixel value of the pixel in the image may be reduced after the denoising processing is performed on a corresponding pixel in the image.

In some embodiments, the processing device may determine the target pixel in the image based on the pixel value of the pixel in the template image. For example, in response to determining that a pixel value of a pixel in the template image corresponding to a pixel in the image is a second value, the pixel value of the pixel in the template image may be determined as a target pixel.

The embodiments of the present disclosure may be select the target pixel based on the template image, which can avoid the need for performing a noise reduction processing on all pixels as shown in the process 300, thereby improving a noise reduction rate of the image, and reducing computational complexity.

In some embodiments, the pixel in the image may be arranged based on a preset rule (e.g., traversing by row), and a first pixel in the arrangement may be designated as the target pixel (e.g., adjusting the pixel value). Further, the next pixel in the arrangement may be designated as a new target pixel, and so on, until all pixels in the image that need to be adjusted are adjusted.

The relevant pixel of the target pixel refers to a pixel that associates with the target pixel. An association relationship may be between the relevant pixel and the target pixel. The association relationship between the relevant pixel and the target pixel may include a distance association, a pixel value association, or the like. The distance association may include distance between the target pixel and the relevant pixel satisfying a condition, e.g., less than a distance threshold, exceeding a distance threshold, etc. The pixel value association may include an initial pixel value of the target pixel and an initial pixel value of the relevant pixel satisfying a condition, e.g., a difference between the initial pixel value of the target pixel and the initial pixel value of the relevant pixel less than a value threshold, etc.

In some embodiments, the relevant pixel may include a pixel determined based on differences between the pixels in the image. In some embodiments, the difference between the pixels in the image may include a difference between the pixel value of each of the pixels in the image and the pixel value of the target pixel. The processing device may determine the relevant pixel of the target pixel based on the difference of the pixel values between each of the pixels in the image and the target pixel. For example, a pixel whose pixel value has a difference with the pixel value of the target pixel that satisfies a difference may be determined as a relevant pixel of the target pixel. The difference condition may be that a difference between the pixel values of two pixels (e.g., a pixel in the image and the target pixel) is less than a certain threshold.

In some embodiments, the differences between the pixels may be determined based on a difference image. For example, the pixel value of a pixel in the difference image may be designated as a difference between the pixel and the target pixel in the image. More descriptions of the difference image may be found in the following descriptions.

In some embodiments, the processing device may determine a pixel set based on the first condition; determine a pixel that satisfies a second condition in the pixel set; determine, based on the pixel that satisfies the second condition as the relevant pixel of the target pixel. The second condition may be determined based on a pixel value of a pixel in a difference image of the image. More descriptions of the first condition, the pixel set, the second condition, and the difference image may be found in FIG. 4, FIG. 5, and descriptions thereof.

In 330, a target pixel value of the target pixel may be determined by adjusting an initial pixel value of the target pixel based on the relevant pixel. In some embodiments, operation 330 may be performed by the adjustment module 230.

The initial pixel value may be an original and unadjusted pixel value of the target pixel in the image. The target pixel value may be an adjusted pixel value of the target pixel.

In some embodiments, a manner for adjusting the initial pixel value of the target pixel may be determined based on the template image. For example, different manners may be used to adjust the initial pixel value of the target pixel to determine the target pixel value of the target pixel based on the pixel values in the template image. In some embodiments, the manner for adjusting the initial pixel value of the target pixel to determine the target pixel value of the target pixel may be determined based on the features (e.g., the pixel value of the pixel) of other images (e.g., the difference image, the standard deviation image, etc.) and/or a preset requirement.

In some embodiments, the manner for adjusting the initial pixel value of the target pixel to determine the target pixel value of the target pixel may include determining an average difference value based on a target difference, and adding the initial pixel value of the target pixel to the average difference value as the target pixel value. In some embodiments, the average difference value may include an average value of elements in the target difference. More description of the target difference may be found in FIG. 5 and related descriptions. The target difference may be a pixel value of the pixel in the difference image corresponding to the target pixel in the image, i.e., the target difference may include difference values between the pixel value of the target pixel in the image and the multiple pixels in the pixel set, respectively.

The process of determining the average difference value based on the target difference may include determining a value of an element corresponding to the relevant pixel from the target difference, and determining the average difference value (e.g., calculate the average value) based on the value of the element.

In some embodiments, when the target pixel corresponds to multiple neighborhood regions, a target difference in each difference image corresponding to the target pixel may be determined, an average value of the average difference values corresponding to different target differences may be determined, and an adjusted target pixel may be determined by adding the initial pixel value of the target pixel and the average value. More description of the neighborhood region may be found in FIG. 4 and related descriptions.

In some embodiments, the average difference value may include a weighted average of elements in the target difference, and a weight of elements in the target difference may be determined based on the template image. More descriptions of the target difference may be found in FIG. 5 and related descriptions.

In some embodiments, the weight of each element in the target difference may be determined based on the template image according to the preset requirement. For example, the preset requirement may include enhancing a contrast of black blood vessel edges in the adjusted image and reducing a white noise. Correspondingly, if the pixel value of the pixel corresponding to the target pixel in the template image is a first value, the smaller an element value of an element in the target difference is, the greater a weight corresponding to the element may be; the larger the element value, of an element in the target difference is the smaller the weight corresponding to the element may be. If the pixel value of the target pixel corresponding to the pixel in the template image is a second value, the smaller the element value of an element in the target different is, the smaller the weight corresponding to the element may be; the larger the element value of an element in the target difference is, the smaller the weight corresponding to the element may be.

In some embodiments, by introducing the template image, the initial pixel values of target pixels with different features (e.g., being black or white compared to the reference image) in the image may be adjusted based on the target pixel and the pixel value of the target pixel in the reference image to determine the different target pixel values of the target pixel, thereby obtaining an adjusted image that better meets the preset requirement.

In some embodiments, the adjusting the initial pixel value of the target pixel to determine the target pixel value of the target pixel may include determining statistical features (e.g., an arithmetical average) of the pixel values of the relevant pixels of the target pixel and determining the initial pixel value of the target pixel with the statistical features.

The process for adjusting the initial pixel value of the target pixel to determine the target pixel value of the target pixel may include other feasible manners, and the provided manner above is merely for illustration, which may not be limited herein.

In some embodiments, by determining the relevant pixel of the target pixel in the image and determining the target pixel value of the target pixel by adjusting the initial pixel value of the target pixel based on the relevant pixel, the image quality (e.g., reducing the noise) can be improved effectively, clearer image structure information (e.g., human tissue structure information, human tissue distribution information, etc.) can be obtained, thereby improving the quality of medical diagnosis.

FIG. 4 is a flowchart illustrating an exemplary process for determining an image according to some embodiments of the present disclosure. In some embodiments, the process 400 may be performed by a processing device (e.g., the processing device 120 shown in FIG. 1). As shown in FIG. 4, the process 400 may include the following operations.

In 410, a count of feature layers and feature extraction parameters of each of the feature layers used in an image multiscale layering technique may be determined.

A feature layer refers to a functional layer used to extract image features at different scales. The count of the feature layers may affect the depth of the feature extraction. For example, the higher the count of the feature layers is, the processing device may perform multiple feature extractions on a scanning image, resulting in a deeper feature extraction depth and finer features of sub-images of the scanning image, such as a smaller resolution.

In some embodiments, the processing device may determine the count of feature layers and feature extraction parameters based on a noise reduction requirement of the image. For example, the processing device may determine the count of the feature layers and the feature extraction parameters of each feature layer through a feature corresponding table based on the noise reduction requirement of the image (e.g., a t degree of required noise reduction, a required noise reduction rate, etc.). The feature corresponding table may include a reference noise reduction requirement, a corresponding reference count of feature layers, and a reference feature extraction parameter of each feature layer. The feature corresponding table may be established based on a historical count of feature layers and historical feature extraction parameters, or through artificial experience, a machine learning model (e.g., a neural network model), and other manners.

The feature extraction parameters refer to parameters used to guide the feature extraction of each of the feature layers. In some embodiments, the feature extraction parameters may include spatial domain features of the scanning image (e.g., a pixel value, a color, a texture, etc.), frequency domain features (e.g., Fourier transform), or the like.

In some embodiments, the processing device may determine a global image feature of the scanning image; determine the count of the feature layers and feature extraction parameters of each of the feature layer based on the global image feature.

The global image feature may be configured to reflect an overall feature of the scanning image. In some embodiments, the global image feature may include an average grayscale value, a signal-to-noise ratio, a chromaticity histogram of the scanning image, or the like, or any combination thereof.

It should be understood that global image feature may affect the noise reduction requirement. For example, if the signal-to-noise ratio of the scanning image is relatively low, the processing device needs to set a relatively large noise reduction requirement to improve the quality of the sub-images processed by using the image multiscale layering techniques, thereby affecting the count of feature layers and the setting of the feature extraction parameters.

In some embodiments, the processing device may determine the global image feature through a manner such as a feature extraction technique, an arithmetic operation, etc. For example, the processing device may determine an average grayscale value of the grayscale values of all pixels in the scanning image as the global image feature of the scanning image.

In some embodiments, the processing device may determine the count of the feature layers and the feature extraction parameters based on the global image feature through a manner such as a table, a matrix database, a machine learning model, or the like.

In some embodiments, the processing device may determine the count of the feature layers and the feature extraction parameters based on the global image feature by using a parameter determination model. In some embodiments, the parameter determination model may include a trained machine learning model, such as a deep neural networks (DNN) model.

In some embodiments, an input of the parameter determination model may include a global image feature of the scanning image, and an output of the parameter determination model may include the count of feature layers and the feature extraction parameters of each of the feature layer.

In some embodiments, the parameter determination model may be trained through training samples with training labels. The training samples may include a global image feature of a sample scanning image, and the label may include the count of sample feature layers and the sample feature extraction parameters of each of the sample feature layers. In some embodiments, the processing device may determine the training samples and the corresponding labels based on historical data in image multiscale layering. In some embodiments, the processing device may determine the training samples and the corresponding labels through various manners such as the network model and manual input.

In some embodiments, the input of the parameter determination model may include a noise reduction requirement. Correspondingly, in the training of the parameter determination model, the training samples may also include a sample noise reduction requirement of the scanning image.

Accordingly, the noise reduction requirements may also be used as a reference of image multiscale layering, so that the parameter determination model may determine a corresponding count of the feature layers and the feature extraction parameters. Correspondingly, in some embodiments, the training samples of the parameter determination model may also include a sample noise reduction requirement. The sample noise reduction requirement may be determined based on historical image denoising data, or determined through various manners such as manual annotation.

In some embodiments, based on the global image feature of the scanning image, the parameter determination model may be used to determine the count of the feature layers and the feature extraction parameters without the need of determining the count of feature layers and the feature extraction parameters manually. Determining the count of the feature layers and the feature extraction parameters may help determine the sub-images with different features in subsequent image multiscale layering, thereby determining the image more accurately and improving the accuracy and efficiency of image processing.

In 420, the scanning image may be mapped into the multiple sub-images with different features according to the count of the feature layers and the feature extraction parameters and an image for substant processing may be determined based on one or more of the multiple sub-images.

In some embodiments, the processing device may map the scanning image into the multiple sub-images with different features by performing image multiscale layering through a manner such as a spatial domain-based feature extraction and/or a frequency domain-based feature extraction. The spatial domain-based feature extraction refers to extracting the sub-images from the images based on spatial domain features. The spatial domain-based feature extraction may include using an edge detection technique, a Fourier description value technique, a local binary pattern technique, etc. The frequency domain-based feature extraction refers to extracting the sub-images from the images based on frequency domain features. The frequency domain-based feature extraction may include a discrete cosine transform technique, a wavelet transform technique, or the like.

In some embodiments, the processing device may reverse process the processed sub-images to obtain a processed image of the scanning image. More descriptions of the image, the reverse processing may be found in FIG. 3 and related descriptions.

In some embodiments, by determining the count of feature layers and the feature extraction parameters of each of the feature layer, the scanning image may be mapped into the sub-images with different features, which can reduce the noise in the image obtained by reverse processing and improve the accuracy of image processing.

Figure 5:
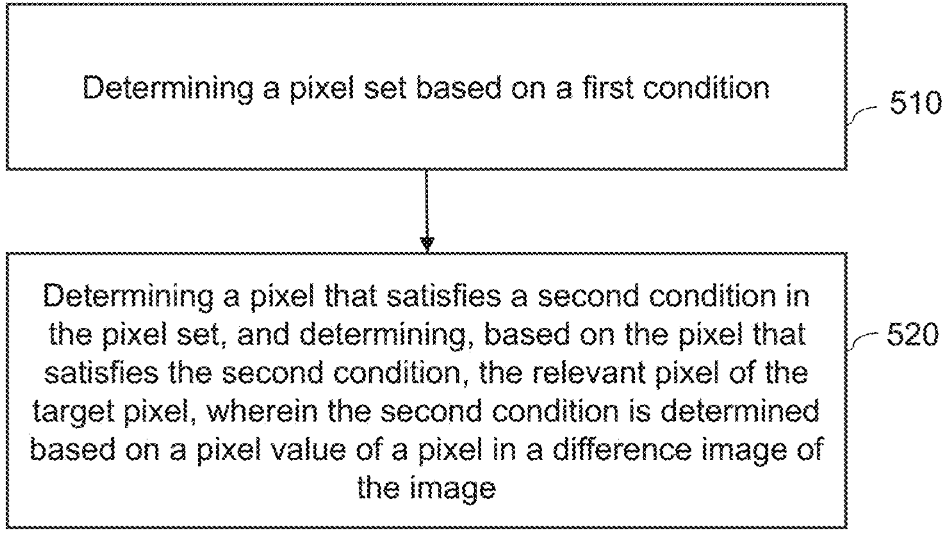
FIG. 5 is a flowchart illustrating an exemplary process for determining a relevant pixel according to some embodiments of the present disclosure.

FIG. 5 is a flowchart illustrating an exemplary process for determining a relevant pixel according to some embodiments of the present disclosure. In some embodiments, the process 500 may be performed by a processing device (e.g., the processing device 120 shown in FIG. 1). As shown in FIG. 5, the process 500 may include the following steps.

In 510, a pixel set may be determined based on a first condition. In some embodiments, the operation 510 may be performed by the determination module 220.

The pixel set may include multiple first pixels in the image that satisfies the first condition.

In some embodiments, a pixel in the image that satisfies the first condition may be determined as a first pixel.

In some embodiments, the first condition may include that the pixel located within a neighborhood region centered around a target pixel and is not the target pixel.

The neighborhood region may be a region around the target pixel used to evaluate the pixel value of the target pixel.

In some embodiments, the processing device may determine the neighborhood region corresponding to the target pixel based on the target pixel and neighborhood parameter information. The neighborhood parameter information may be used to determine the neighborhood region. The neighborhood parameter information may include at least one of a shape or scale of the neighborhood region. The shape of the neighborhood region may include a rectangle, a cross shape, an X-shape, a circle, or the like. The scale of the neighborhood region may be configured to describe the size of the neighborhood region. In some embodiments, the scales of neighborhood regions with different shapes may be represented differently. For example, the scale of a neighborhood region with a rectangular shape may be denoted by the length and width of the rectangle. In some embodiments, the target pixel may correspond to one or more different neighborhood regions.

In some embodiments, the processing device may determine the neighborhood region corresponding to the target pixel based on the shape and the scale of the neighborhood region with the target pixel as a center. As an image 710 shown in FIG. 7, a pixel 811 is a target pixel with coordinates (x, y), the neighborhood parameter information includes the shape of the neighborhood region as a rectangle with a scale of 3*3, it may be determined that except for the target pixel in the neighborhood region, the neighborhood region may further include 8 pixels (i.e., first pixels), which are a pixel 812, a pixel 813, a pixel 814, a pixel 815, a pixel 816, a pixel 817, a pixel 818, and a pixel 819, with coordinates (x−1,y+1), (x,y+1), (x+1,y+1), (x−1,y), (x+1,y), (x−1,y−1), (x,y−1), (x+1, y−1), respectively.

In some embodiments, the neighborhood parameter information corresponding to different target pixels may be the same. When the target pixel corresponds to the multiple neighborhood regions, the processing device may determine the multiple neighborhood region parameter information.

The shape and scale of the neighborhood region in the first condition may be determined based on user requirements and/or historical data. For example, if the user needs to balance a quality and speed of image processing, the count of pixels in the neighborhood region may be set to be a relatively large count of pixel. Correspondingly, the shape and scale of the neighborhood region in the first condition may be rectangular with a length and width of 3, at this time, there are 8 pixels in the neighborhood region. As another example, if the user needs to prioritize improving a speed of image processing, the count of pixels in the neighborhood region may be set to be relatively small. Correspondingly, the shape and scale of the neighborhood region in the first condition may be a cross shaped shape with a length and width of 3, at this time, there are 4 pixels in the neighborhood region.

In some embodiments, the processing device may determine the neighborhood parameter information of the neighborhood region using a neighborhood determination model based on the image. The neighborhood determination model may be a trained machine learning model. For example, the neighborhood determination model may be constructed based on a deep neural network model.

In some embodiments, an input of the neighborhood determination model may include the image, an output of the neighborhood determination model may include the neighborhood parameter information. More descriptions of the image may be found in FIG. 4 and descriptions thereof.

In some embodiments, the neighborhood determination model may be trained through training samples with training labels. Each of the training samples may include a sample image, and the label of the sample image may include sample neighborhood parameter information of a sample neighborhood region applicable to the sample image. In some embodiments, the processing device may determine multiple sample neighborhood regions with different shapes and scales based on the sample image; determine a denoised image that satisfies a noise reduction condition by processing the sample image using a noise reduction manner (e.g., the image processing process in the present disclosure), and determining a shape and scale of a neighborhood region in the denoised image as sample neighborhood parameter information of a sample neighborhood region, which is also referred to as a label corresponding to the sample image. The noise reduction condition may be a best noise reduction effect, and a denoising effect of the denoised image may be determined through manual annotation. The processing device may determine relevant neighborhood parameter information of the sample neighborhood region through manual annotation. In some embodiments, the noise reduction effect of the target image may be determined according to a difference between an actual global image feature of the target image (e.g., an average grayscale value, a signal-to-noise ratio, a chromaticity histogram, etc.) and a noise reduction requirement, resulting in selecting a target image with a best noise reduction effect. For example, the smaller the difference between the actual global image feature of the target image (e.g., an average grayscale value, a signal-to-noise ratio, a chromaticity histogram, etc.) and the noise reduction requirement is, the better the noise reduction effect may be reflected.

In some embodiments, based on the neighborhood determination model, the neighborhood parameter information may be determined, which can improve the efficiency of determining neighborhood region, avoid errors caused by manual judgment, and thus improve the quality of the processed image.

In some embodiments, when the image is determined using the image multiscale layering process on the scanning image, the processing device may also obtain the count of target feature layers corresponding to the image and the target feature extraction parameters of each target feature layer using the image multiscale layering process; and determine neighborhood parameter information of the neighborhood region based on the count of target layers and the target feature extraction parameters.

The target feature layer refers to a feature layer corresponding to the image used in the image multiscale layering process for the scanning image. The target feature extraction parameters of a target feature layer refer to parameters used for feature extraction by the target feature layer. More descriptions of the image, the target count of the target feature layers, and the target feature extraction parameters may be found in FIG. 4 and related descriptions.

In some embodiments, the processing device may determine the neighborhood parameter information of the neighborhood region based on the count of the target feature layers and the target feature extraction parameters of each target feature layer. For example, the processing device may search for a reference count of the feature layers and reference feature extraction parameters that are similar to or the same as the count of target feature layers and the target feature extraction parameters in a parameter corresponding table based on the count of target feature layers and the target feature extraction parameters, and determine the neighborhood parameter information corresponding to the reference count of feature layers and reference feature extraction parameters. The parameter corresponding table may be established based on historical images and corresponding historical neighborhood regions. The historical images and corresponding historical neighborhood regions may be obtained by the processing device through the network or manual input.

In some embodiments, by determining the neighborhood parameter information based on the target count of target feature layers and the target feature extraction parameters of each target feature layer, the image and the neighborhood parameter information of the image may be determined simultaneously using the image multiscale layering process, which can improve the efficiency of image processing. Meanwhile, a corresponding neighborhood region may be determined based on different images purposefully, which can process different images accurately, thereby improving the quality of the processed images.

In some embodiments, the neighborhood parameter information corresponding to different target pixels may also be different.

In some embodiments, the processing device may determine neighborhood parameter information of the neighborhood region corresponding to the target pixel based on the initial pixel value of the target pixel and a reference pixel value of the reference pixel in a reference region, and determine neighborhood parameter information of the neighborhood region corresponding to the target pixel based on the initial pixel value of the target pixel and the reference pixel value of the reference pixel.

The reference region may be a region including a reference range of the target pixel. For example, the reference region corresponding to the target pixel may be a 10*10 region centered on the target pixel. The reference pixel may be a pixel within the reference region and is not the target pixel. In some embodiments, the reference region may be designated as a candidate neighborhood region. Correspondingly, the processing device may determine the reference region based on a relationship between the reference pixel and the target pixel, and determine the neighborhood parameter information corresponding to the reference region.

In some embodiments, the processing device may determine a region feature of the reference region based on the initial pixel value of the target pixel and the reference pixel value of the reference pixel.

The region feature of the reference region may an average, a variance, and other values of pixels within the reference region. The pixel values of different pixels in the reference region may include an initial pixel value of the target pixel and a reference pixel value of the reference pixel. The region feature reflects an overall pixel feature of the reference region, such as a magnitude of the pixel value variation of each pixel between reference regions.

In some embodiments, the processing device may determine the neighborhood parameter information of the neighborhood region corresponding to the target pixel based on the region feature. For example, the processing device may determine the neighborhood parameter information of the neighborhood region corresponding to the target pixel by inputting the region feature into a relationship table. The relationship table may include a corresponding relationship between the region feature of the reference region and the neighborhood parameter information of the neighborhood region. The relationship table may be established based on a historical reference region feature and neighborhood parameter information of the corresponding historical neighborhood region. The historical reference region feature and the neighborhood parameter information of the corresponding historical neighborhood region may be obtained by the processing device through the network or manual input.

In some embodiments, the neighborhood parameter information may be determined based on the preset reference region and the reference pixel, which can make the determined neighborhood region of the target pixel more accurate, thereby improving the accuracy of image processing.

In some embodiments, the processing device may divide the image into multiple sub-regions. In some embodiments, the processing device may determine a type of a sub-region corresponding to the target pixel among the plurality of sub-regions, determine neighborhood parameter information of the neighborhood region corresponding to the target pixel based on the type, and determine the neighborhood region corresponding to the target pixel based on the target pixel and the neighborhood parameter information.

The sub-region may include a set of pixels with similar or same attributes. The types corresponding to different sub-regions may be different, and the type refers to an attribute feature of the sub-region, such as a location of the sub-region. In some embodiments, the type may include an edge region or a non-edge region. The edge region may include an edge pixel and one or more adjacent pixels, such as an edge pixel and adjacent pixels within a range of 20*20 pixels from the edge pixel (as shown in a sub-region 622 in FIG. 6B). The size of an adjacent pixel may be set according to user requirements. If a desired sub-region is clearly divided, the size of the adjacent pixel may be set to be relatively large.

In some embodiments, the processing device may divide the image into the multiple sub-regions in a manner as described below.

Figure 6A:
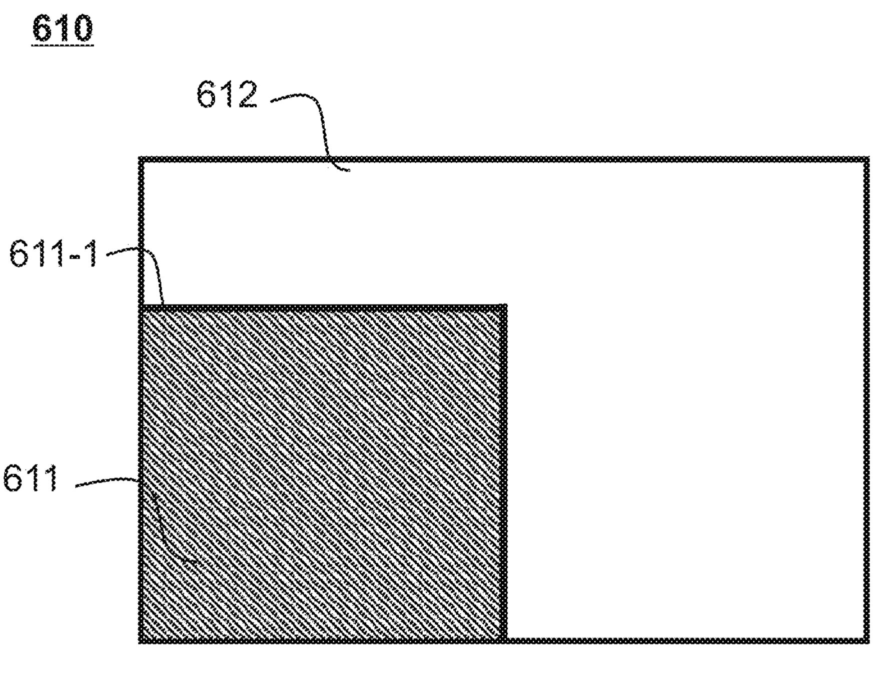
FIG. 6A is a schematic diagram illustrating an exemplary image according to some embodiments of the present disclosure.
Figure 6B:
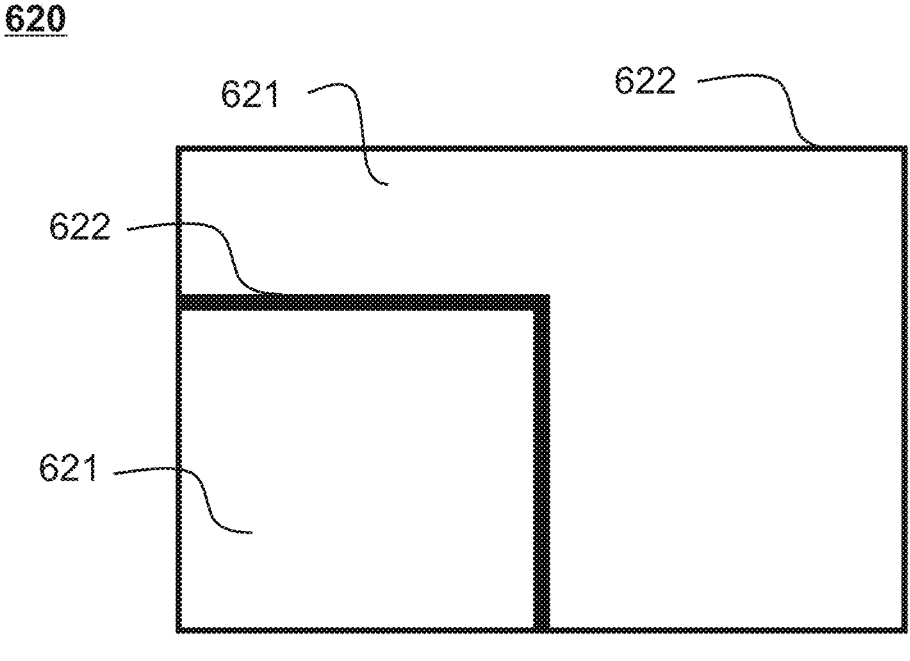
FIG. 6B is a schematic diagram illustrating an exemplary divided image according to some embodiments of the present disclosure.

For example, as shown in FIG. 6A, an image 610 is an image to be processed, and image 610 may include a region 611 and a region 612, respectively, representing positions of tissue A and tissue B. An edge 611-1 is an edge of tissue A. The processing device may process the image 610 to obtain an image 620 as shown in FIG. 6B. As shown in FIG. 6B, image 620 may be a divided image to be processed, and the image 620 may include a sub-region 621 and a sub-region 622. The sub-region 621 includes a non-edge region of tissue A and a non-edge region of tissue B, while the sub-region 622 includes an edge region of tissue A and an edge region of tissue B.

In some embodiments, the processing device may determine the multiple sub-regions based on the image using a region division model, and the region division model may be a trained machine learning model.

In some embodiments, an input of the region division model may include an image, and an output of the region division model may include an image containing the multiple sub-regions. When the sub-types of the sub-regions only include an edge-region and a non-edge region, an output of the region division model may be a binary image. For example, an input of the region division model may include the image 610, and an output of the region division model may include the image 620. Compared to the image 610, the image 620 processed by division may exhibit binarization features, which can more clearly divide and display corresponding types of different tissues, thus determining the neighborhood parameter information of the target pixel in subsequence quickly.

In some embodiments, the region division model may be trained through training samples with labels. The training samples may include the sample images, and the labels may include reference sample images including multiple sample sub-regions corresponding to the sample images. In some embodiments, the processing device may divide a sample image based on the sample image using a manner such as manual annotation, image segmentation, etc., to obtain the reference sample image including the multiple sample sub-regions, i.e., the label corresponding to the sample image.

In some embodiments, the image may be divided based on the region division model, which can improve the efficiency of determining the sub-regions and avoid errors caused by manual judgment, thereby improving the quality of the processed image.

In some embodiments, the processing device may utilize image algorithms such as a Histogram of Oriented Gradient (HOG) algorithm to divide the image into the multiple sub-regions.

In some embodiments, the type of the sub-region may include a corresponding human tissue type, such as a muscle tissue, an epithelial tissue, or the like. Correspondingly, an input of the region division model may include the count and type of sub-regions. Correspondingly, an image output by the region division model may be a multivalued image. A count of sub-regions in the multivalued image may be the same as the count of the regions input into the region division model, and the type of the sub-region may be the same as the type of the sub-region inputted into the region division model.

Correspondingly, when training the region division model, the training samples may also include the count of sample sub-regions and the type of sample sub-regions. The label may include sample images including multiple sample sub-regions and corresponding to the images. The count of multiple sample sub-regions may be the same as the count of sample sub-regions, and the types of the multiple sample sub-regions may be the same as the types of sample sub-regions. In some embodiments, the processor may divide the sample image, using various manners such as manual annotation, image segmentation based on the sample images, the count of sample sub-regions, and the types of sample sub-regions to obtain the sample image including the multiple sample sub-regions, i.e., determining as a label corresponding to the sample image.

When the image is determined by performing the image multiscale layering process on the scanning image, the processing device may further obtain a count of feature layers corresponding to the image and feature extraction parameters of each of the feature layers; determine a count of the plurality of sub-regions and types of the plurality of sub-regions based on the count of target feature layers and the target feature extraction parameters; and determine the plurality of sub-regions by dividing the image based on the count of the plurality of sub-regions and the types of the plurality of sub-regions.

The count and types of the plurality of sub-regions may be a basis for dividing the sub-regions, which may be used to reflect features of different sub-regions.

In some embodiments, the processing device may determine the count and types of the sub-regions based on the count of target feature layers and the target feature extraction parameters through a manner such as a table and matrix database. For example, the processing device may construct an image feature matrix based on the count of target layers and the target feature extraction parameters, retrieve a reference image feature matrix similar to the image feature matrix in the matrix database, and determine the count and types of reference regions corresponding to the reference image feature matrix as the count and types of the sub-regions. The matrix database may store multiple reference image feature matrixes and corresponding count and types of reference regions. The reference image feature matrix may be constructed based on the count of target feature layers and target feature extraction parameters of historical images in the image multiscale layering process. The count and types of reference regions may be constructed based on historical sub-region data or determined by manual annotation.

In some embodiments, the processing device may determine the count and types of sub-regions based on user requirements. For example, if the user needs to obtain an image with high accuracy after processing, the count of regions and the types of regions may be increased to finely divide the image and determine a neighborhood region of the target pixel more targeted, thereby improving the quality of the processed image.

In some embodiments, the processing device may determine the count and types of sub-regions based on the global image feature corresponding to the image. For example, if a signal-to-noise ratio in the global image feature is relatively high, the processing device may set a relatively small count of regions and a relatively small count of the types to improve the efficiency of image processing while ensuring the image quality.

In some embodiments, the processing device may determine the count and types of sub-regions based on the global image feature of the image through a manner such as the preset table and matrix database. For example, the processing device may retrieve a reference global image feature similar to the global image feature exceeding a similarity feature threshold based on the global image feature of the image. The count and types of reference regions corresponding to the reference global image feature may be determined as the count and types of sub-regions.

The similarity feature threshold may be determined based on manual experience, and a corresponding relationship between the reference global image feature and the count and types of reference regions may be constructed based on historical sub-region data or determined by manual annotation. More descriptions of determining the global image feature may be found in FIG. 4 and related descriptions.

In some embodiments, the count and types of sub-regions may be determined based on the count of target layers and the target feature extraction parameters, the image and divided sub-regions may be determined simultaneously in the image multiscale layering process, further improving the efficiency of image processing.

In some embodiments, the types may be determined based on a basis of dividing the image by the processing device. For example, the processing device may obtain multiple sub-regions of the edge regions or non-edge regions by dividing the image based on position of the pixel.

Correspondingly, in some embodiments, each target pixel may correspond to a sub-region on the same scale, such as a type of the sub-region corresponding to the target pixel may be the edge region or the non-edge region.

In some embodiments, the processing device may determine a type of each target pixel based on a sub-region corresponding to the target pixel. For example, the processing device may determine, based on a position of the target pixel, a sub-region and type of the target pixel where the position is located.

In some embodiments, the neighborhood region corresponding to the target pixel may be related to the types of the sub-regions. For example, when the type of the sub-region is an edge region, the shape and scale of the neighborhood region in the neighborhood parameter information of the target pixel may be set relatively small to determine the relevant pixel more accurately. In some embodiments, the processing device may determine neighborhood parameter information of the neighborhood region corresponding to the target pixel based on the type of the sub-region. For example, the processing device may determine the neighborhood parameter information of the neighboring region corresponding to the target pixel by inputting the type of the sub-region into a preset sub-region relationship table. The preset sub-region relationship table may include a corresponding relationship between the type of the sub-region and the neighborhood parameter information of the neighboring region. The preset sub-region relationship table may be established based on a historical reference type and neighborhood parameter information corresponding to a historical neighborhood region. The historical type and the neighborhood parameter information of the corresponding historical neighborhood region may be obtained by the processing device through the network or manual input.

In some embodiments, the neighborhood parameter information may be determined based on the type of the sub-region where the target pixel is located, which can make the determined neighborhood region of the target pixel more accurate, thereby improving the accuracy of image processing.

In 520, a pixel that satisfies a second condition may be determined in the pixel set, and the relevant pixel of the target pixel from the pixel set may be determined based on the pixel that satisfies the second condition. In some embodiments, operation 520 may be performed by the determination module 220.

In some embodiments, the second condition may be determined based on the pixel value of the pixel in the difference image of the image. For example, the second condition may include a value of an element in the target difference being less than the difference threshold; the target difference may include a pixel value of a pixel in the difference image corresponding to the target pixel, the threshold template image may be obtained based on a difference degree of the pixel value in the image. More description of two corresponding pixels may be found in FIG. 7 and related descriptions.

The difference image refers to an image obtained based on a difference between the pixels in the image. The difference image and the image have a same image size.

In some embodiments, the pixel value of the pixel in the difference image may be determined based on the difference between the pixel value of the pixel in the image and the pixel values of the different pixels in the neighborhood region. The shape and scale of the neighborhood region may be a shape and scale of the neighborhood region in the first condition, and the difference between the pixel values may include a difference between pixel values, an absolute value of the difference between pixel values, or any other feasible values. More descriptions of the two corresponding pixels may be found in FIG. 7 and related descriptions.

In some embodiments, the pixel values of a pixel in the difference image may be denoted as a matrix with a dimension that is same as the count of pixels and positions of pixels in the neighborhood region of a pixel in the image corresponding to the pixel in the difference image. In other words, the count of elements in the matrix of a pixel in the difference image is the same as the count of pixels in the neighborhood region of a pixel in the image corresponding to the pixel in the difference image. In some embodiments, a value of an element in the matrix may correspond to a difference value between a pixel value of one of the pixels in the image corresponding to the one of the pixel in the neighborhood region of the pixel and a pixel value of the pixel in the image. For example, a corresponding pixel of the pixel A in the difference image may be a pixel B in the image, pixels in the neighborhood region of the pixel B may include a pixel C, a pixel D, and a pixel E located on a right side of the pixel, a pixel value a of the pixel A in the difference image may be a one-dimension matrix, which can be denoted as $a=(c-b, d-b, e-b)$, wherein b, c, d, e represent pixel values of the pixel B, C, D, and E. More descriptions of the two corresponding pixels, the difference image, and determining the pixel value of the pixel in the difference image may be found in FIG. 7 and related descriptions. Correspondingly, the target difference may also be denoted as a matrix. Each element in the target difference may correspond to each pixel in the pixel set. For example, a position of each pixel in the pixel set in the image may be relevant to a position of the element in the target difference. The value of each element in the target difference may be determined based on a difference between the pixel value of the target pixel in the image and the pixel value of the correspondingly pixel in the pixel set in the image. It should be noted that when the target pixel corresponding to the multiple neighborhood regions, the processing device may determine the multiple difference images correspondingly, wherein the pixel value in each difference image may be a difference value between each of the pixel values of the pixels within a neighborhood region of the pixel in the image and the one of the pixel values of the pixels in the image.

In some embodiments, the processing device may determine the pixel that satisfies the second condition as the relevant pixel of the target pixel.

In some embodiments, the processing device may further: in response to determining that a pixel value of a pixel in a template image corresponding to the target pixel is a first value, determine a pixel that satisfies a third condition as the relevant pixel of the target pixel, wherein the third condition may include a pixel value of a pixel in the image being greater than or equal to the pixel value of the pixel in the image corresponding to the target pixel; and in response to determining that a pixel value of a pixel in a template image corresponding to the target pixel is a second value, determine a pixel that satisfies a fourth condition as the relevant pixel of the target pixel, wherein the fourth condition may include a pixel value of a pixel in the image being less than or equal to the pixel value of the pixel in the image corresponding to the target pixel.

In some embodiments, the pixel value of the pixel in the difference image may be related to a correction factor of the pixel.

The correction factor refers to a factor used to adjust the pixel value of the pixel in the difference image. The correction factor may cause the pixel value of the pixel in the difference image to change from a pixel value representing the difference to a pixel value representing the differences based on the weight (i.e., the correction factor). The correction factors of the pixels may be different. The correction factors may be expressed in numerical or other forms.

In some embodiments, a correction factor of the pixel in the difference image may be determined based on a grayscale value of the corresponding pixel (i.e., the target pixel) in the image and a first parameter. In some embodiments, the correction factor of the pixel in the difference image may be obtained according to the following Equation (2):

$$g = 1 - \left(\frac{p}{m}\right)^{\alpha}, \tag{2}$$

where g represents a correction factor of the pixel in the difference image, p represents a grayscale value of a corresponding pixel in the image, m represents a normalization factor (e.g., m may be taken as 255), and a represents a first parameter. More description for the two corresponding pixels may be found in FIG. 7 and related descriptions.

In some embodiments, the first parameter may be determined based on actual requirements and/or historical data. For example, the first parameter may be 0.5.

In some embodiments, the first parameter may be determined based on an image feature of the image.

The image feature of the image refers to a feature used to describe an overall condition of the image, such as an average grayscale value, an average resolution, or the like.

In some embodiments, the image feature of the image may include a signal-to-noise ratio, and the first parameter may be determined based on the signal-to-noise ratio. For example, the higher the signal-to-noise ratio of the image is, the larger the first parameter may be.

The signal-to-noise ratio refers to a ratio of a signal and a power spectrum of noise in an image. The signal-to-noise ratio may be obtained through a manner, such as determining a local variance of each pixel in the image (i.e., a variance of the pixel value of a pixel and the pixel within the neighborhood region), and designating a ratio of a maximum value to a minimum value of the local variance as the signal-to-noise ratio.

In some embodiments, the first parameter may be determined based on the image feature of the image, so that the first parameter may be adapted to the image with different image features more flexibly, and when applying the first parameter to a calculation of the pixel value of the pixel in the difference image, a calculation result with relatively strong adaptability to the image may be obtained, thus improving the quality of the processed image.

In some embodiments, the pixel value of the pixel in the difference image may be obtained according to the following Equation (3):

$$c' = g \cdot c, \tag{3}$$

where c' represents a pixel value of the pixel, g represents a correction factor of the pixel, c represent a matrix (one or more dimensions) formed by the difference between the pixel value of the corresponding pixel in the image and the pixel value of the pixel within the neighborhood region, g·c represents a multiplication result of numerical value g and matrix c, for example, if g=0.9, c=(1, 2, 3), g·c=(0.9, 1.8, 2.7).

In some embodiments, by introducing the correction factor, the pixel value (i.e., an element in the matrix) of the corresponding pixel in the difference image may be smaller for the pixel with higher grayscale values in the image, i.e., the higher the grayscale of the pixel is, the smaller the surrounding noise may be, resulting in more elements remaining in the pixel value of the corresponding pixel in the difference image for subsequent calculation.

Figure 7:
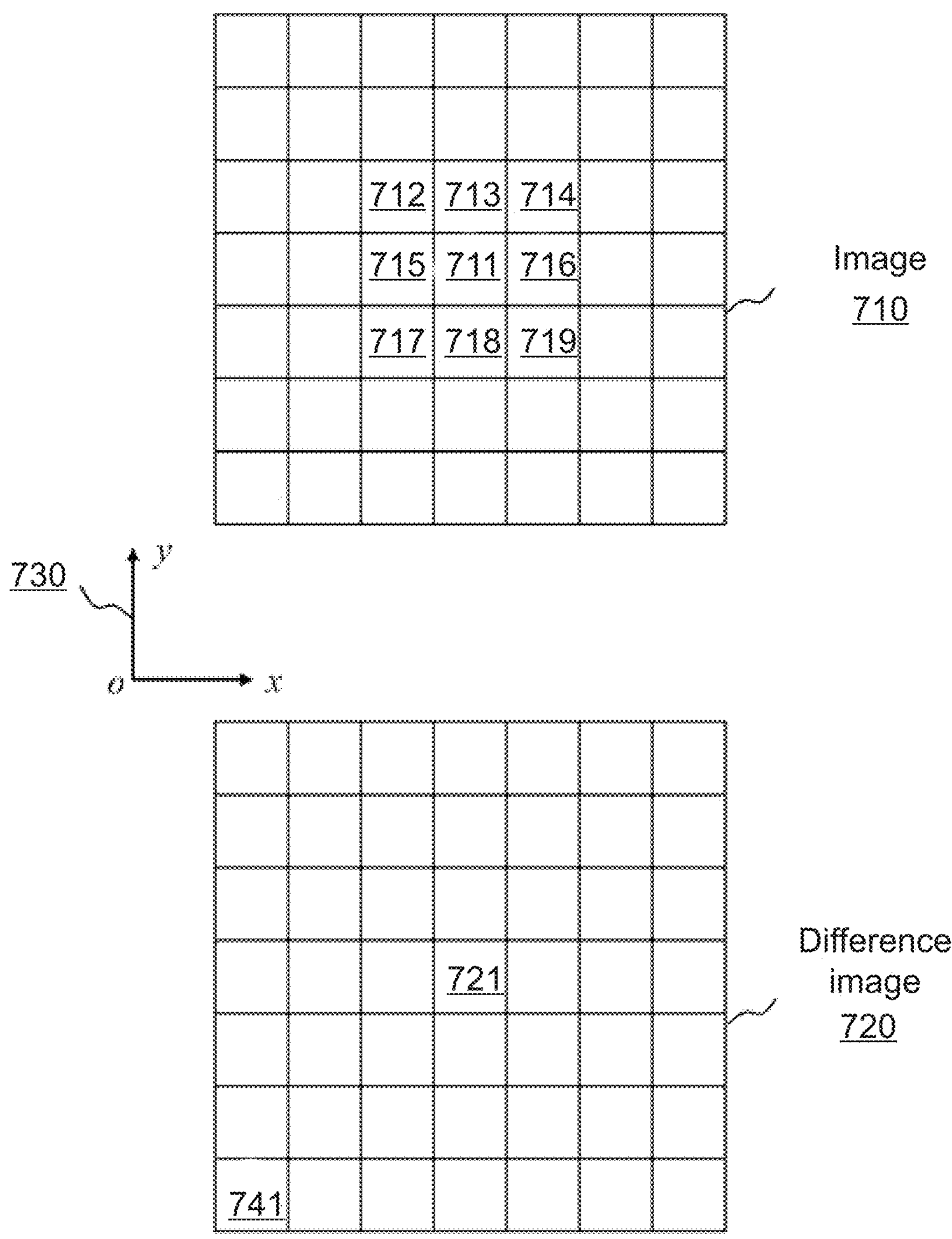
FIG. 7 is a schematic diagram illustrating an exemplary process for determining a difference image and a pixel value of a pixel in the difference image according to some embodiments of the present disclosure.

In some embodiments, the second condition may include a value of an element in the target difference being less than the difference threshold; the target difference may include a pixel value of a pixel in the difference image corresponding to the target pixel, the threshold template image may be obtained based on a difference degree of the pixel value in the image More descriptions of the corresponding pixels and the process of determining the pixel value of the pixel in the difference image may be found in FIG. 7 and related descriptions.

A corresponding element of the pixel in the target difference refers to an element whose pixel value of the pixel is used in the target difference during the determination of the target difference. For example, the target pixel is a pixel A, and the pixel in the pixel set may include a pixel B, a pixel C, and a pixel D, and the target difference may be (b–a, c–a, d–a), where a, b, c, d represents pixel values of the pixels A, B, C, and D. An element b–a refers to an element that uses the pixel value b of the pixel B during the calculation, so a corresponding element of the pixel B in the target difference may be b–a; similarly, an element corresponding to the pixel C in the target difference may be c–a, an element corresponding to the pixel D in the target difference may be d–a; if b–a is less than a preset value in the second condition, then pixel B is a pixel that satisfies the second condition.

In some embodiments, the second condition may include that a value of the corresponding element in the target difference of a pixel in the pixel set is less than a pixel value of the corresponding pixel in the threshold template image of the target pixel. The target difference may be a pixel value of the pixel corresponding to the target pixel in the difference image; the threshold template image may be an image obtained based on a difference degree of the pixel values in the image. For example, the target pixel is a pixel A, and the pixels in the pixel set may include a pixel B, a pixel C, and a pixel D, and the target difference may be (b–a, c–a, d–a), wherein a, b, c, d represents pixel values of the pixels A, B, C, and D. An element corresponding to the pixel B in the target difference may be b–a, an element corresponding to the pixel C in the target difference may be c–a, and an element corresponding to the pixel D in the target difference may be d–a. Further, if b–a is smaller than the pixel value of the pixel corresponding to the target pixel in the threshold template image, and the pixel B may be a pixel that satisfies the second condition. More descriptions of the threshold template image and the process for determining the pixel value of the pixel in the threshold template image may be found in FIG. 8 and related descriptions.

In some embodiments, the second condition may be constructed based on other features, such as a distance between pixel coordinates, an edge intersection between a pixel resolution and a threshold, or the like.

In some embodiments, a condition judgment in the second condition may be constructed based on the pixel value of the pixel in the threshold template image, so that when determining whether the pixel set of different target pixels satisfies the second condition, different thresholds may be used to adaptively adjust the initial pixel values of different target pixels, thus optimizing the effect of the final image processing.

In some embodiments, the pixel set may be determined based on the first condition. A pixel that satisfies the second condition may be determined in the pixel set, and a relevant pixel of the target pixel may be determined based on the pixel that satisfies the second condition, the relevant pixel may be gradually determined according to the different levels, so that the relevant pixel may be selected based on more features, which can increase the usage scenarios of the relevant pixel and improve universality.

FIG. 7 is a schematic diagram illustrating an exemplary process for determining a difference image and a pixel value of a pixel in the difference image according to some embodiments of the present disclosure.

As shown in FIG. 7, image 710 has a same image size as difference image 720 (i.e., 7×7 in the figure). Each small grid refers to a pixel of image 710 or difference image 720. In some embodiments, image 710 may be the image as described in operation 310 of FIG. 3.

The coordinates of a pixel may be used to describe a relative position of the pixel in the image under a coordinate system. For example, the coordinate system is a rectangular coordinate system 730. A direction of an X-axis of the rectangular coordinate system 730 is from left to right and a direction of y-axis of the rectangular coordinate system 730 is from bottom to top. A pixel 731 in the image 710 or A pixel 741 in the difference image 720 is designated as an origin of the rectangular coordinate system 730, coordinates of the origin is (1, 1), coordinates of a pixel 711 in the image 710 is (4, 4); coordinates of a pixel 721 in the difference image 720 is (4, 4).

As used herein, the corresponding pixels in images (e.g., two pixels in two images (e.g., the image and the difference image), three pixels in three images (e.g., the image, the difference image, the reference image)), refer to pixels having a position corresponding relationship, and the position corresponding relationship between the pixels refers to that the pixels have the same coordinates (i.e., a same row and same column) in their respective images in the same coordinate system. For example, the pixel 711 in the image 710 and the pixel 721 in the difference image 720 are two pixels with a position corresponding relationship, i.e., the pixel 711 in the image 710 corresponds to the pixel 721 in the difference image 720, while the pixel 721 in the difference image 720 corresponds to the pixel 711 in the image 710. As another example, the pixel 731 in the image 710 and the pixel 741 in the difference image 720 are two pixels with a position corresponding relationship. The position corresponding relationship between two pixels may be applicable to any other two images with the same image size in some embodiments of the present disclosure, such as the position corresponding relationship between two pixels in the threshold template image and the standard deviation image, the position corresponding relationship between two pixels in the template image and the reference image, or the like. More descriptions of the threshold template image and the standard deviation image may be found in FIG. 8 and related descriptions.

The pixel value of the pixel in the difference image 720 is denoted as a matrix with a dimension that is same as the count of pixels and the positions of pixel in the neighborhood region of the corresponding pixel in the image 710. In other words, the count of elements in the matrix of a pixel in the difference image 720 is the same as the count of pixels in the neighborhood region of a pixel in the image 710 corresponding to the pixel in the different image 720. Each element in the matrix denoting the pixel value of a pixel in the difference image 720 is a difference between the pixel value of a pixel in the neighborhood region of the image 710 and the pixel value of the pixel in the image 710 that corresponds to the pixel in the difference image 720. Taking the determination of the pixel value of the pixel 721 in the difference image 720 as an example, the pixel 721 in the image 720 corresponds to a pixel 711 in image 710, assuming that the shape of the neighborhood region in the first condition is rectangular and the scale is 3, pixels within the neighborhood region of the pixel 711 includes a pixel 712, a pixel 713, a pixel 714, a pixel 715, a pixel 716, a pixel 717, a pixel 718, and a pixel 719, the pixel value of the pixel 721 is denoted as a matrix including 8 elements, and a position of each element in the matrix may be related to a position of each pixel in the image. The 8 elements represent a difference between the pixels in the neighborhood region of the pixel 711 and the pixel 711, for example, a first element value is a difference between the pixel 712 and the pixel 711, a second element value is a difference between the pixel 713 and the pixel 711, . . . , an eighth element value is a difference between the pixel 719 and the pixel 711.

The pixel values of other pixels in the difference image 720 may also be determined using the above process.

Figure 8:
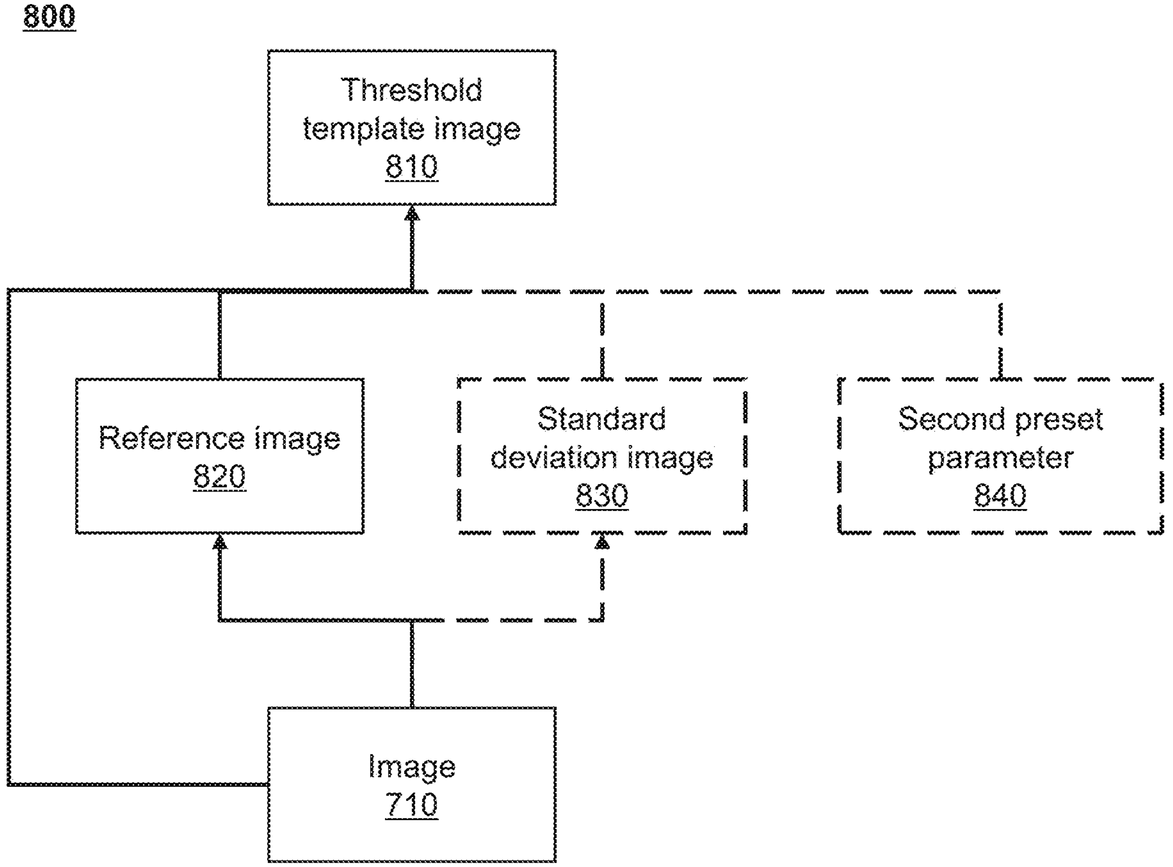
FIG. 8 is a schematic diagram illustrating an exemplary process for determining a pixel value of a pixel in a threshold template image according to some embodiments of the present disclosure.

FIG. 8 is a schematic diagram illustrating an exemplary process for determining a pixel value of a pixel in a threshold template image according to some embodiments of the present disclosure.

In some embodiments, the pixel value of a pixel in the threshold template image may be determined through the process 800 shown in FIG. 8.

In some embodiments, the process 800 may be performed by the processing device.

The threshold template image may be configured to determine whether the pixel in the first pixel satisfies the second condition. The threshold template image may be configured to determine that whether the pixel in the pixel set satisfies a second condition. The threshold template image and the image have a same image size. The image may be similar to or the same as the image obtained in operation 310 as described in FIG. 3.

As shown in FIG. 8, in some embodiments, the pixel value of a pixel in the threshold template image 810 may be determined based on the pixel value of a pixel in the image 710 corresponding to the pixel in the threshold template image 810 and the pixel value of the pixel in the reference image 820 corresponding to the pixel in the threshold template image 810.

The reference image refers to an image used for comparison and reference. For example, based on a comparison of pixel values of two corresponding pixels in the reference image and the image, the template image may be obtained (see the description in the operation 330). The reference image and the image have a same image size.

In some embodiments, the reference image 820 may be obtained based on the image 710. For example, after performing various image processing (e.g., Gaussian filtering, mean filtering) on the image 710, the reference image 820 may be obtained. One or more combinations of image processing may be related to noise reduction requirements. In some embodiments, the reference image may be obtained through a manner. For example, the reference image may be a default setting of the image processing system 100. As another example, the reference image may be determined according to a noise reduction requirement. As still another example, the reference image may be determined based on a layer level of a feature layer and the feature extraction parameters corresponding to the image in the image multi-scale layering process.

In some embodiments, different sub-regions of the reference image may also be obtained based on different image processing algorithms, and the image processing algorithm corresponding to may be determined based on the region feature of the corresponding sub-region of the image. More descriptions of the sub-region may be found in FIG. 5 and related descriptions.

In some embodiments, the pixel value of the pixel in threshold template image 810 may be determined based on the pixel value of the corresponding pixel in the image 710 and the reference pixel value of the corresponding pixel in the reference image 820. In some embodiments, the pixel value of pixel in the threshold template image may be obtained according to the following Equation (4):

$$e = |o - a|, \tag{4}$$

where e represents a pixel value of the pixel in the threshold template image, o represents a pixel value of the corresponding pixel in the image, a represents a reference pixel value of the corresponding pixel in the reference image. More descriptions of the corresponding pixels may be found elsewhere in the present disclosure (e.g., FIG. 5 and related descriptions).

Correspondingly, in some embodiments, the processing device may determine the threshold template image based on the pixel value of each pixel in the image 710 and the reference pixel value of each corresponding pixel in reference image 820. For example, the processing device may use an absolute value of a difference value between the pixel value of a pixel in the image 710 and the reference pixel value of the corresponding pixel in reference image 820 as a pixel value of the corresponding pixel in the threshold template image. More descriptions of the image 710 and the reference image 820 may be found in above descriptions.

In some embodiments, the processing device may determine an overall difference of each pixel in the image based on the pixel value of each pixel in the image; based on the overall difference, the processing device may determine the threshold template image.

The overall difference refers to a parameter that represents a difference among multiple pixels. The overall difference may be used to represent a difference among the pixel values of the pixels in the image. In some embodiments, the overall difference may be denoted by a parameter, such as a variance and an average value of the pixel values of the pixels in the image.

In some embodiments, the processing device may determine the threshold template image based on the overall difference through a manner such as the table and/or matrix database.

In some embodiments, the processing device may determine a threshold corresponding to a pixel in the image based on a region feature corresponding to a threshold comparison region of the pixel; and determine the threshold template image based on the threshold corresponding to each pixel.

The region feature may include to the average value and variance of pixel values of the pixels within the threshold comparison region. The region feature of the threshold comparison region reflects an overall pixel feature of the threshold comparison region. For example, the processing device may use the average value or variance of pixel values of the pixels within each threshold comparison region as the region feature of the threshold comparison region based on the pixel values of the pixels in the threshold comparison region.

In some embodiments, the threshold corresponding to the pixel may be used to reflect a maximum pixel value that the pixel can be adjusted. In some embodiments, the pixel value of the pixel in the threshold template image may be the same as the threshold corresponding to the pixel.

In some embodiments, the processing device may determine the threshold template image based on user requirements. For example, if the user needs to obtain an accurate image after processing, the threshold corresponding to the pixel may be increased to process the image and improve the quality of the processed image accurately.

In some embodiments, the processing device may determine the count and types of sub-regions based on the global image feature corresponding to the image. For example, if the signal-to-noise ratio in the global image feature is relatively high, the processing device may set a relatively small count of regions and types to improve the efficiency of image processing while ensuring the image quality.

In some embodiments, the processing device may determine the threshold template image based on the global image feature of the image through a manner such as the table and/or matrix database. For example, the processing device may retrieve a reference global image feature similar to the global image feature of the image in the table or the matrix database, and determine the reference threshold template image corresponding to the reference global image feature as the threshold template image.

The corresponding relationship between the reference global image feature and the reference threshold template image may be determined by manual annotation. More descriptions of the process of determining the global image feature may be found in FIG. 4 and related descriptions.

In some embodiments, the pixel value of a pixel in the threshold template image may be related to a dispersion degree of the pixel value distribution in the image and the second parameter.

For each pixel value of the pixel in the threshold template image, the dispersion degree of the pixel value distribution represents a deviation degree of multiple pixel values of related pixels in a corresponding region of the pixel. For example, the corresponding region of the pixel may be a neighborhood region corresponding to the pixel, and the multiple pixel values of the related pixels may be pixel values of the pixels in the neighborhood region corresponding to the pixel. In some embodiments, the dispersion degree of the pixel value distribution of the pixel may be characterized by statistical features (e.g., a standard deviation) of the multiple pixel values of the related pixels.

In some embodiments, the dispersion degree of pixel value distribution in the image may be determined based on a standard deviation image. For example, the pixel value of a pixel in the standard deviation image may be used as the dispersion degree of the pixel value distribution in the image.

The standard deviation image may include pixels whose pixel values are standard deviations determined based on a certain calculation manner (e.g., determining a standard deviation of the pixel values of multiple pixels in an image). The standard deviation image and the image has the same image size. Each of the pixels in the standard deviation image may correspond to a pixel in the image. The pixel value of a pixel in the standard deviation image may denote a standard deviation of a pixel value of a pixel in the image corresponding to the pixel in the standard deviation image from the average value of the multiple pixel values of pixels associated with the pixel in the image. In some embodiments, the pixels in the image associated with the pixel in the image may include pixels in the neighborhood region of the pixel in the image. In some embodiments, the pixels in the image associated with the pixel in the image may include all pixels in the image.

In some embodiments, the standard deviation image 830 may be obtained based on the image 710. For example, the pixel value of the pixel in the standard deviation image 830 may be a standard deviation of the pixel values of the multiple related pixels in the image 710.

In some embodiments, the pixel value of the pixel in the standard deviation image 830 may include a standard deviation of the pixel values of pixels in the neighborhood region of the corresponding pixel in the image 710. The shape and scale of the neighborhood region may be the shape and scale of the neighborhood region in the first condition, or other shapes and scales may be selected. For example, for determining a pixel value of the pixel A in the standard deviation image, a corresponding pixel of the pixel A in the image may be a pixel B, and a neighborhood region of the pixel B may include a pixel C1, a pixel C2, . . . , and a pixel C8, a standard deviation of the pixel values of the pixel C1, the pixel C2, . . . , and the pixel C8 may be determined. The pixel value of the pixel A may be the standard deviation of the pixel values of the pixel C1, the pixel C2, . . . , and the pixel C8 associated with pixel B. More descriptions of the corresponding pixels may be found elsewhere in the present disclosure (e.g., FIG. 5 and related descriptions).

In some embodiments, a pixel value of a pixel in the threshold template image may be determined based on the pixel value of the corresponding pixel in the image, a pixel value of a corresponding pixel in the reference image, a pixel value of a corresponding pixel in the standard deviation image, and the second parameter.

The pixel value of the pixel in threshold template image 810 may be determined based on the pixel value of the corresponding pixel in the image 710, the pixel value of the corresponding pixel in the reference image 820, the pixel value of the corresponding pixel in the standard deviation image 830, and the second parameter 840.

For each pixel in the threshold template image, the processing device may determine a first candidate threshold based on a pixel value of the pixel in a reference image and a pixel value of the pixel in the image; determine a second candidate threshold based on a pixel value of the pixel in the standard deviation image and the second parameter.

The first candidate threshold refers to a difference threshold determined based on the reference image and the image. The first candidate threshold may be an absolute value of the difference value between the pixel value corresponding to a pixel in the reference image and a pixel in the image.

The second candidate threshold refers to a difference threshold determined based on the standard deviation image and the second parameter. The second candidate threshold may be a product of a pixel value of a pixel in the standard deviation image and the second parameter.

In some embodiments, the processing device may determine the pixel value of the pixel in the threshold template image based on the first candidate threshold and the second candidate threshold by various manners. For example, the processing device may determine an average value of the first candidate threshold and the second candidate threshold as the pixel value of the pixel in the threshold template image.

In some embodiments, the processing device may determine a maximum value in the first candidate threshold and the second candidate threshold as the pixel value of the pixel in the threshold template image. For example, the processing device may obtain the pixel value of the pixel in the threshold template image according to Equation (5):

$$e = \max(|o - a|, b * n), \tag{5}$$

where e represents a pixel value of a pixel in the threshold template image, o represents a pixel value of the corresponding pixel in the image, a represents a pixel value of the corresponding pixel in the reference image, b represents a pixel value of the corresponding pixel in the standard deviation image, n represents the second parameter. More descriptions of the two corresponding pixels may be found elsewhere in the present disclosure (e.g., FIG. 5 and related descriptions).

In some embodiments, the second parameter may be determined based on actual requirements and/or historical data. For example, the second parameter may be 3.

In some embodiments, the second parameter may be determined based on a confidence interval of a normal distribution.

The normal distribution refers to a probability distribution where the probability of observing a specific data value is highest near the average value and rapidly decreases as the difference value from the average value increases.

The differences between the pixel values and noise in the image may follows or approximately follows the normal distribution in a macro sample space of a large count of images.

The confidence interval of the normal distribution refers to a confidence interval with a certain level of confidence. For example, the confidence interval of the normal distribution may be a confidence interval with 95% confidence level, a confidence interval with 90% confidence level, or the like. The confidence interval of the normal distribution with 95% confidence level refers to an interval corresponding to a randomly generated point that has a 95% probability of falling within the interval.

For a normal distribution with an average value μ and a standard deviation σ, a confidence level of a confidence interval [μ−zσ, μ+zσ] may be determined based on a value z (which may be determined by querying a normal distribution z-value table). For example, a confidence interval with a 95% confidence level may be selected, a corresponding z value of the confidence interval with the 95% confidence level may be approximately 1.95 determined based on a lookup table, i.e., a point may be generated randomly with a 95% probability of falling within an interval [μ−1.95σ, μ+1.95σ]. As another example, a confidence interval with a 90% confidence level may be selected, a corresponding z value of the confidence interval with the 90% confidence level may be approximately 1.64 determined based on a lookup table, i.e., a point may be generated randomly with a 90% probability of falling within an interval [μ−1.64σ, μ+1.640].

In some embodiments, the second parameter may be determined based on the confidence level of the confidence interval of the normal distribution. For example, the second parameter may be a multiple (i.e., the z-value) of a standard deviation that an interval endpoint of the confidence interval corresponding to the confidence level is deviated from the average value. For example, a multiple of a standard deviation that an interval endpoint deviates from the average value of a confidence interval [μ−1.95σ, μ+1.95σ] is 1.95, indicating that the interval endpoint deviates from the average value u and a deviation amplitude is 1.95 standard deviation σ. For example, the confidence level may be set to 95%, the confidence interval may be [μ−1.95σ, μ+1.95σ], and the second parameter may be 1.95.

The confidence level may be determined based on actual requirements and/or historical data. For example, based on the actual requirements, it is desired to retain as many pixels as possible from the pixel set, and the confidence level may be set relatively high, such as 99%.

In some embodiments, the second parameter may be determined based on the confidence interval of the normal distribution, elements in the target difference that exceed a difference value within the confidence interval of the normal distribution may be found out, the pixels corresponding to the elements in the pixel set may be considered as normal points (or points with noise), the types of the points may not participate in a final adjustment of the initial pixel value of the target pixel, thus utilizing macroscopic prior information to improve the quality of image processing.

In some embodiments, by making the pixel value of the pixel in the threshold template image relative to the dispersion degree of the pixel value distribution in the image and the second parameter, multidimensional information may be fully considered, the pixel value of the pixel in the threshold template image may be determined by using more relevant information (e.g., the dispersion degree of the pixel value distribution in the image), which can improve a rationality of the pixel value of the pixel in the threshold template image, make the pixels in the pixel set filtered based on the threshold template image having a greater improvement effect on the final image quality.

The basic concepts have been described. Obviously, for those skilled in the art, the detailed disclosure may be only an example and may not constitute a limitation to the present disclosure. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the specification are not necessarily all referring to the same embodiment. In addition, some features, structures, or features in the present disclosure of one or more embodiments may be appropriately combined.

Moreover, unless otherwise specified in the claims, the sequence of the processing elements and sequences of the present application, the use of digital letters, or other names are not used to define the order of the application flow and methods. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various assemblies described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure and aiding in the understanding of one or more of the various embodiments. However, this disclosure may not mean that the present disclosure object requires more features than the features mentioned in the claims. In fact, the features of the embodiments are less than all of the features of the individual embodiments disclosed above.

In some embodiments, the numbers expressing quantities, properties, and so forth, used to describe and claim certain embodiments of the application are to be understood as being modified in some instances by the term "about," "approximate," or "substantially." Unless otherwise stated, "about," "approximate," or "substantially" may indicate a ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Although the numerical domains and parameters used in the present application are used to confirm the range of ranges, the settings of this type are as accurate in the feasible range in the feasible range in the specific embodiments.

Each patent, patent application, patent application publication, and other materials cited herein, such as articles, books, instructions, publications, documents, etc., are hereby incorporated by reference in the entirety. In addition to the application history documents that are inconsistent or conflicting with the contents of the present disclosure, the documents that may limit the widest range of the claim of the present disclosure (currently or later attached to this application) are excluded from the present disclosure. It should be noted that if the description, definition, and/or terms used in the appended application of the present disclosure is inconsistent or conflicting with the content described in the present disclosure, the use of the description, definition and/or terms of the present disclosure shall prevail.

At last, it should be understood that the embodiments described in the disclosure are used only to illustrate the principles of the embodiments of this application. Other modifications may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for image processing, comprising:

obtaining an image; and for a target pixel in the image;

determining, from the image, a relevant pixel of the target pixel; wherein the relevant pixel is determined based on a difference between the target pixel and other pixels in the image, wherein the determining the relevant pixel of the target pixel includes:

determining a pixel set based on a first condition; and determining a pixel that satisfies a second condition in the pixel set, and determining, based on the pixel that satisfies the second condition, the relevant pixel of the target pixel, wherein the second condition is determined based on a pixel value of a pixel in a difference image of the image, the second condition includes a value of an element in a target difference being smaller than a difference threshold, the target difference includes a pixel value of a pixel in the difference image corresponding to the target pixel, the difference threshold is a pixel value of a pixel in a threshold template image corresponding to the target pixel, the threshold template image is obtained based on a difference degree of pixel values in the image, the value of the pixel in the threshold template image is relevant to a dispersion degree of a pixel value distribution in the image and a second parameter, the dispersion degree of the pixel value distribution in the image is determined based on a standard deviation image, the pixel value of the pixel in the threshold template image is determined according to operations including:

for each pixel in the threshold template image, determining a first candidate threshold based on a pixel value of the pixel in a reference image and a pixel value of the pixel in the image;

determining a second candidate threshold based on a pixel value of the pixel in the standard deviation image and the second parameter; and determining a pixel value of the pixel in the threshold template image based on the first candidate threshold and the second candidate threshold; and determining a target pixel value of the target pixel by adjusting an initial pixel value of the target pixel based on the relevant pixel.

2. The method of claim 1, wherein the obtaining an image includes:

obtaining a scanning image; and determining a count of feature layers in an image multiscale layering process;

determining feature extraction parameters of each of the feature layers; and mapping the scanning image into the multiple sub-images with different features according to the count of the feature layers and the feature extraction parameters; and determining the image based on one or more of the multiple sub-images.

3. The method of claim 2, wherein the determining the count of feature layers and the feature extraction parameters of each of the feature layers includes:

determining a global image feature of the scanning image; and determining the count of the feature layers and the feature extraction parameters of each of the feature layer based on the global image feature.

4. The method of claim 1, wherein the first condition includes that a pixel is located within a neighborhood region centered around the target pixel and is not the target pixel.

5. The method of claim 4, wherein the neighborhood region is determined according to operations including:

determining neighborhood parameter information of the neighborhood region using a neighborhood determination model based on the image, wherein the neighborhood determination model includes a trained machine learning model; and determining a neighborhood region corresponding to the target pixel based on the target pixel and the neighborhood parameter information.

6. The method of claim 4, wherein the image is determined based on a scanning image using an image multiscale layering process, and the neighborhood region is determined according to operations including:

obtaining a count of target feature layers corresponding to the image and target feature extraction parameters of each of the target feature layers used in an image multiscale layering process of the scanning image;

determining neighborhood parameter information of the neighborhood region based on the count of the target feature layers and the target feature extraction parameters; and determining a neighborhood region corresponding to the target pixel based on the target pixel and the neighborhood parameter information.

7. The method of claim 4, wherein the neighborhood region is determined according to operations including:

determining a reference pixel within a reference region corresponding to the target pixel;

determining the neighborhood parameter information of the neighborhood region corresponding to the target pixel based on the initial pixel value of the target pixel and a reference pixel value of the reference pixel; and determining the neighborhood region corresponding to the target pixel based on the target pixel and the neighborhood parameter information.

8. The method of claim 4, wherein the neighborhood region is determined according to operations including:

dividing the image into a plurality of sub-regions;

determining a type of a sub-region corresponding to the target pixel among the plurality of sub-regions;

determining neighborhood parameter information of the neighborhood region corresponding to the target pixel point based on the type; and determining the neighborhood region corresponding to the target pixel based on the target pixel and the neighborhood parameter information.

9. The method of claim 1, wherein the pixel value of the pixel in the difference image is relevant to a correction factor, and the correction factor is determined based on a grayscale value of a pixel in the image and a first parameter.

10. The method of claim 9, wherein the first parameter is determined based on image features of the image.

11. The method of claim 1, wherein the second parameter is determined based on a confidence interval of a normal distribution.

12. The method of claim 1, wherein determining, based on the pixel that satisfies the second condition, the relevant pixel of the target pixel includes:

determining the pixel that satisfies the second condition as the relevant pixel of the target pixel.

13. The method of claim 1, wherein determining, based on the pixel that satisfies the second condition, the relevant pixel of the target pixel includes:

in response to determining that a pixel value of a pixel in a template image corresponding to the target pixel is a first value, determining a pixel that satisfies a third condition as the relevant pixel of the target pixel, wherein the third condition includes a pixel value of a pixel in the image being greater than or equal to the pixel value of the pixel in the image corresponding to the target pixel; and in response to determining that a pixel value of a pixel in a template image corresponding to the target pixel is a second value, determining a pixel that satisfies a fourth condition as the relevant pixel of the target pixel, wherein the fourth condition includes a pixel value of a pixel in the image being less than or equal to the pixel value of the pixel in the image corresponding to the target pixel.

14. The method of claim 1, wherein the target pixel in the image is determined according to operations including:

obtaining a reference image corresponding to the image;

determining a template image based on the reference image and the image;

determining the target pixel in the image based on a pixel value of a pixel in the template image.

15. A system for performing a data processing task, comprising:

at least one storage device including a set of instructions; and at least one processor configured to communicate with the at least one storage device, wherein when executing the set of instructions, the at least one processor is configured to direct the system to perform operations including:

obtaining an image; and for a target pixel in the image;

determining, from the image, a relevant pixel of the target pixel; wherein the relevant pixel is determined based on a difference between the target pixel and other pixels in the image, wherein the determining the relevant pixel of the target pixel includes:

determining a pixel set based on a first condition; and determining a pixel that satisfies a second condition in the pixel set, and determining, based on the pixel that satisfies the second condition, the relevant pixel of the target pixel, wherein the second condition is determined based on a pixel value of a pixel in a difference image of the image, the second condition includes a value of an element in a target difference being smaller than a difference threshold, the target difference includes a pixel value of a pixel in the difference image corresponding to the target pixel, the difference threshold is a pixel value of a pixel in a threshold template image corresponding to the target pixel, the threshold template image is obtained based on a difference degree of pixel values in the image, the value of the pixel in the threshold template image is relevant to a dispersion degree of a pixel value distribution in the image and a second parameter, the dispersion degree of the pixel value distribution in the image is determined based on a standard deviation image, the pixel value of the pixel in the threshold template image is determined according to operations including:

for each pixel in the threshold template image, determining a first candidate threshold based on a pixel value of the pixel in a reference image and a pixel value of the pixel in the image;

determining a second candidate threshold based on a pixel value of the pixel in the standard deviation image and the second parameter; and determining a pixel value of the pixel in the threshold template image based on the first candidate threshold and the second candidate threshold; and determining a target pixel value of the target pixel by adjusting an initial pixel value of the target pixel based on the relevant pixel.

16. A computer-readable storage medium, comprising at least one set of instructions, wherein when executed by one or more processors of a computing device, the at least one set of instructions causes the computing device to perform a method, the method comprising:

obtaining an image; and for a target pixel in the image;

determining, from the image, a relevant pixel of the target pixel point; wherein the relevant pixel is determined based on a difference among pixels in the image, wherein the determining the relevant pixel of the target pixel includes:

determining a pixel set based on a first condition; and determining a pixel that satisfies a second condition in the pixel set, and determining, based on the pixel that satisfies the second condition, the relevant pixel of the target pixel, wherein the second condition is determined based on a pixel value of a pixel in a difference image of the image, the second condition includes a value of an element in a target difference being smaller than a difference threshold, the target difference includes a pixel value of a pixel in the difference image corresponding to the target pixel, the difference threshold is a pixel value of a pixel in a threshold template image corresponding to the target pixel, the threshold template image is obtained based on a difference degree of pixel values in the image, the value of the pixel in the threshold template image is relevant to a dispersion degree of a pixel value distribution in the image and a second parameter, the dispersion degree of the pixel value distribution in the image is determined based on a standard deviation image, the pixel value of the pixel in the threshold template image is determined according to operations including:

for each pixel in the threshold template image, determining a first candidate threshold based on a pixel value of the pixel in a reference image and a pixel value of the pixel in the image;

determining a second candidate threshold based on a pixel value of the pixel in the standard deviation image and the second parameter; and determining a pixel value of the pixel in the threshold template image based on the first candidate threshold and the second candidate threshold; and determining a target pixel value of the target pixel by adjusting an initial pixel value of the target pixel based on the relevant pixel.

* * * * *